R. W. BROWN.
BRAIDING MACHINE.
APPLICATION FILED JUNE 14, 1917.

1,383,522.

Patented July 5, 1921.
19 SHEETS—SHEET 1.

Inventor
Robert W. Brown
By his Attorneys
Marshall & Dearborn

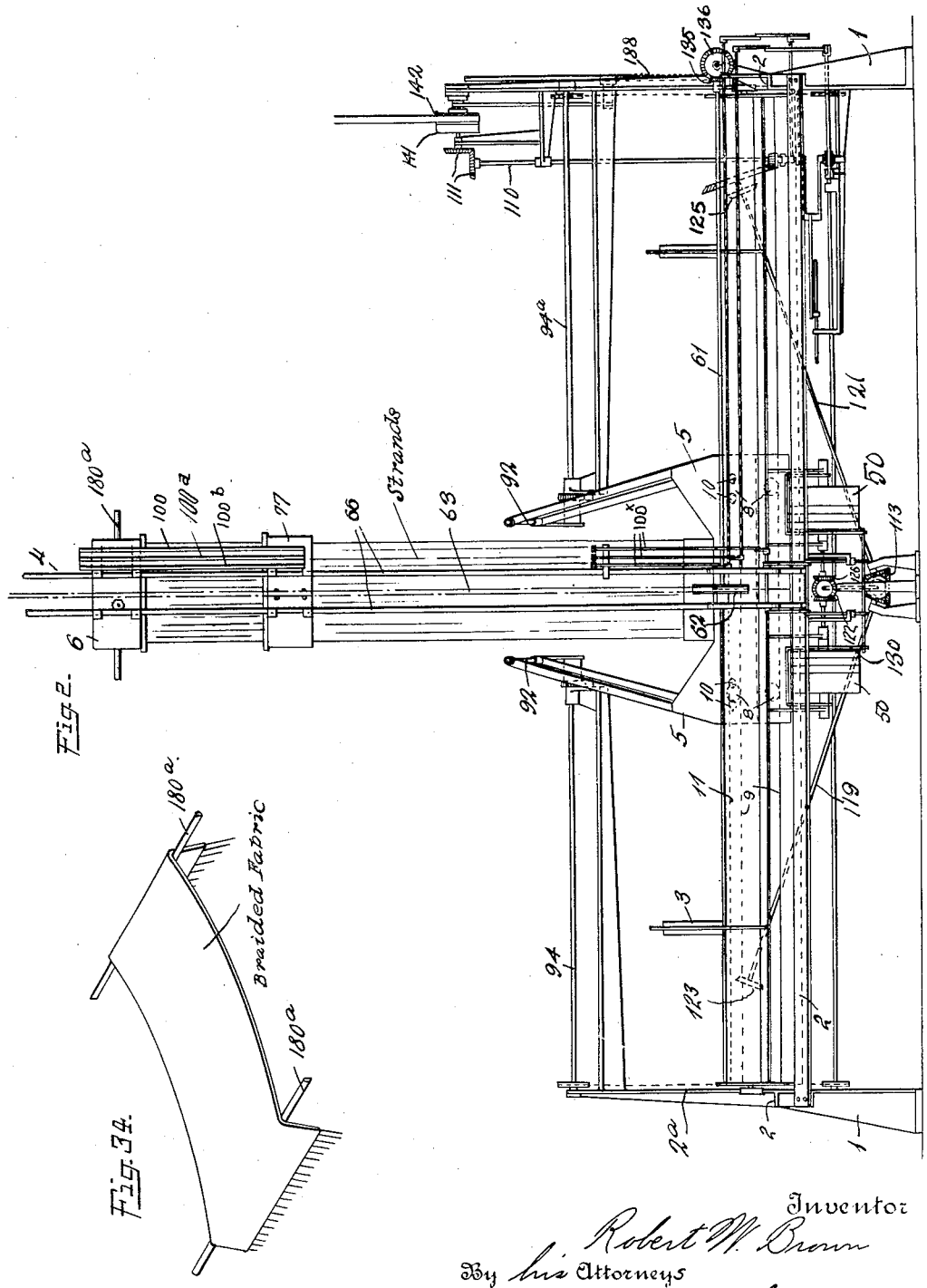

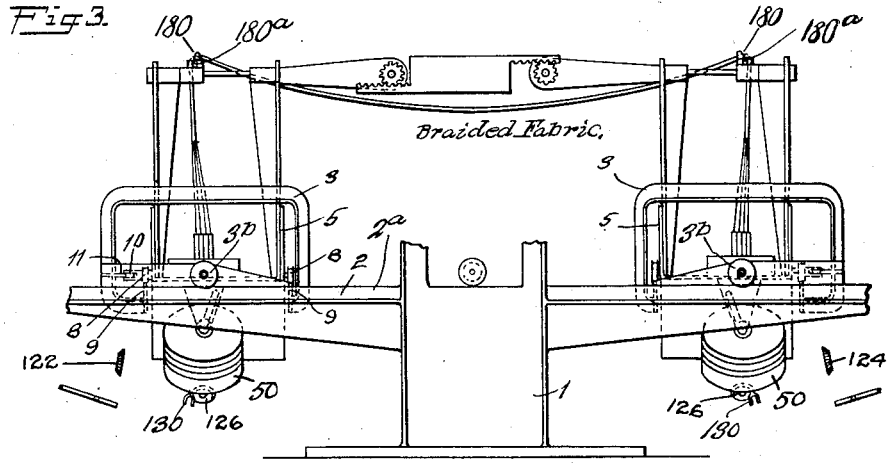
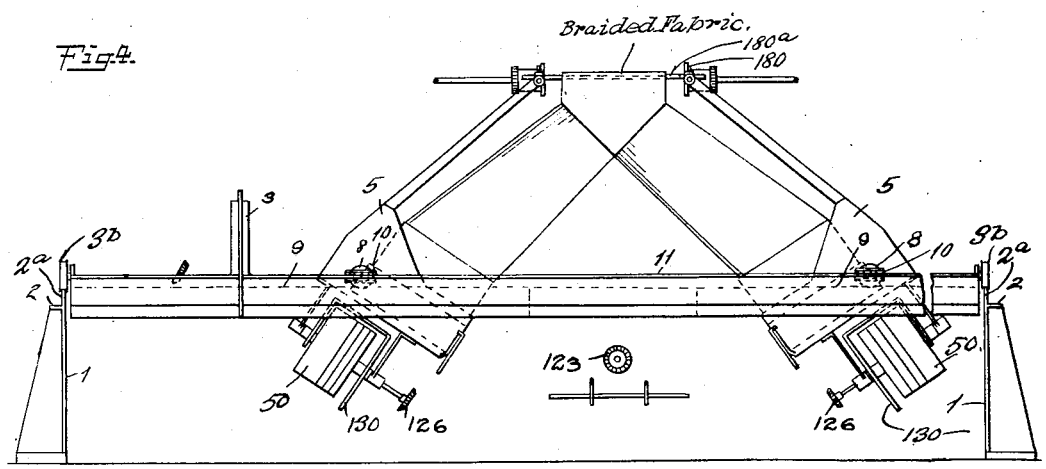
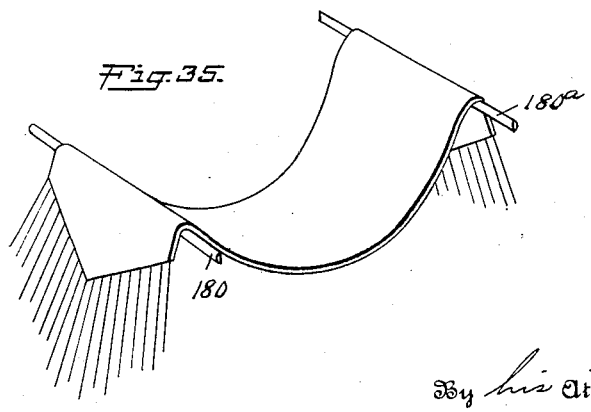

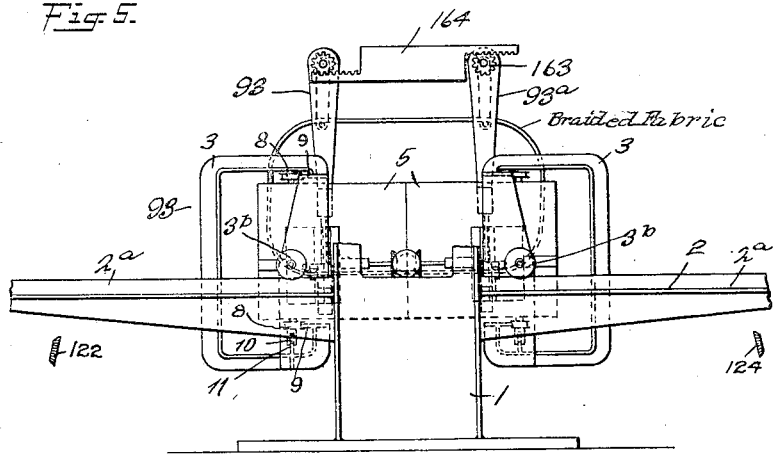
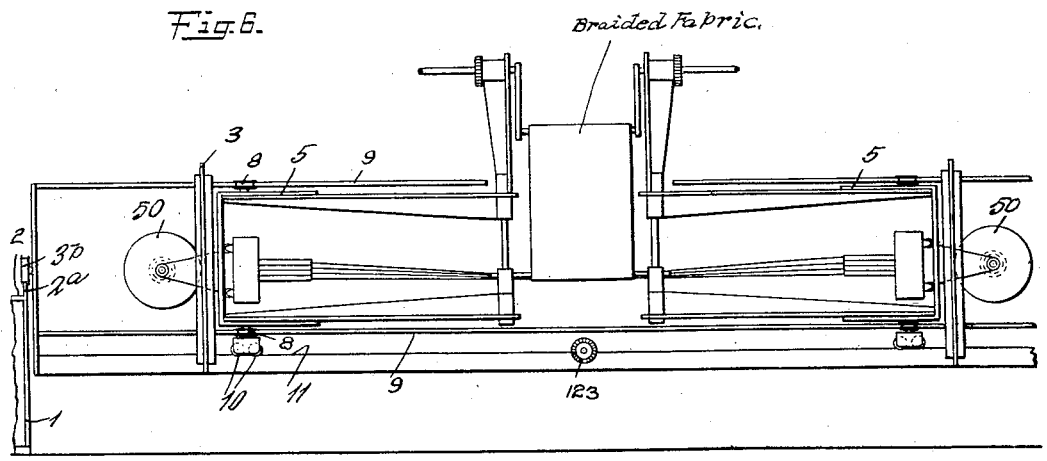
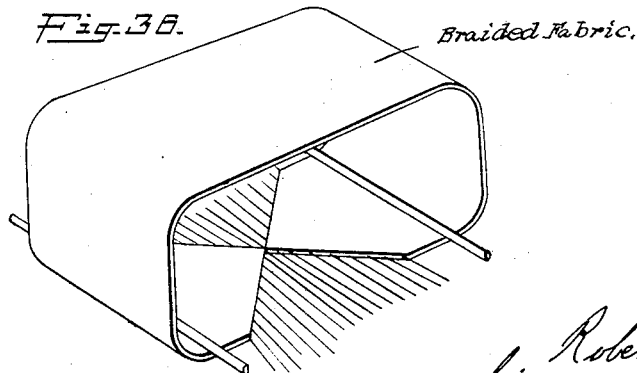

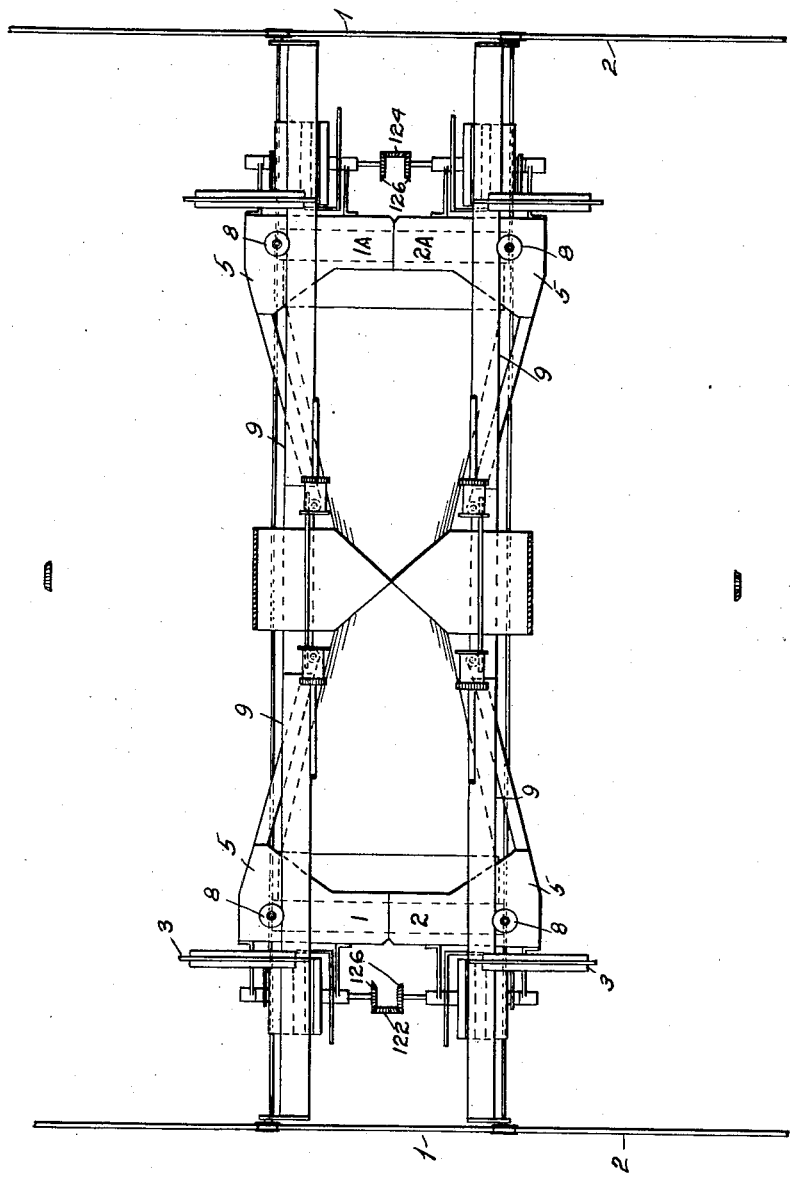

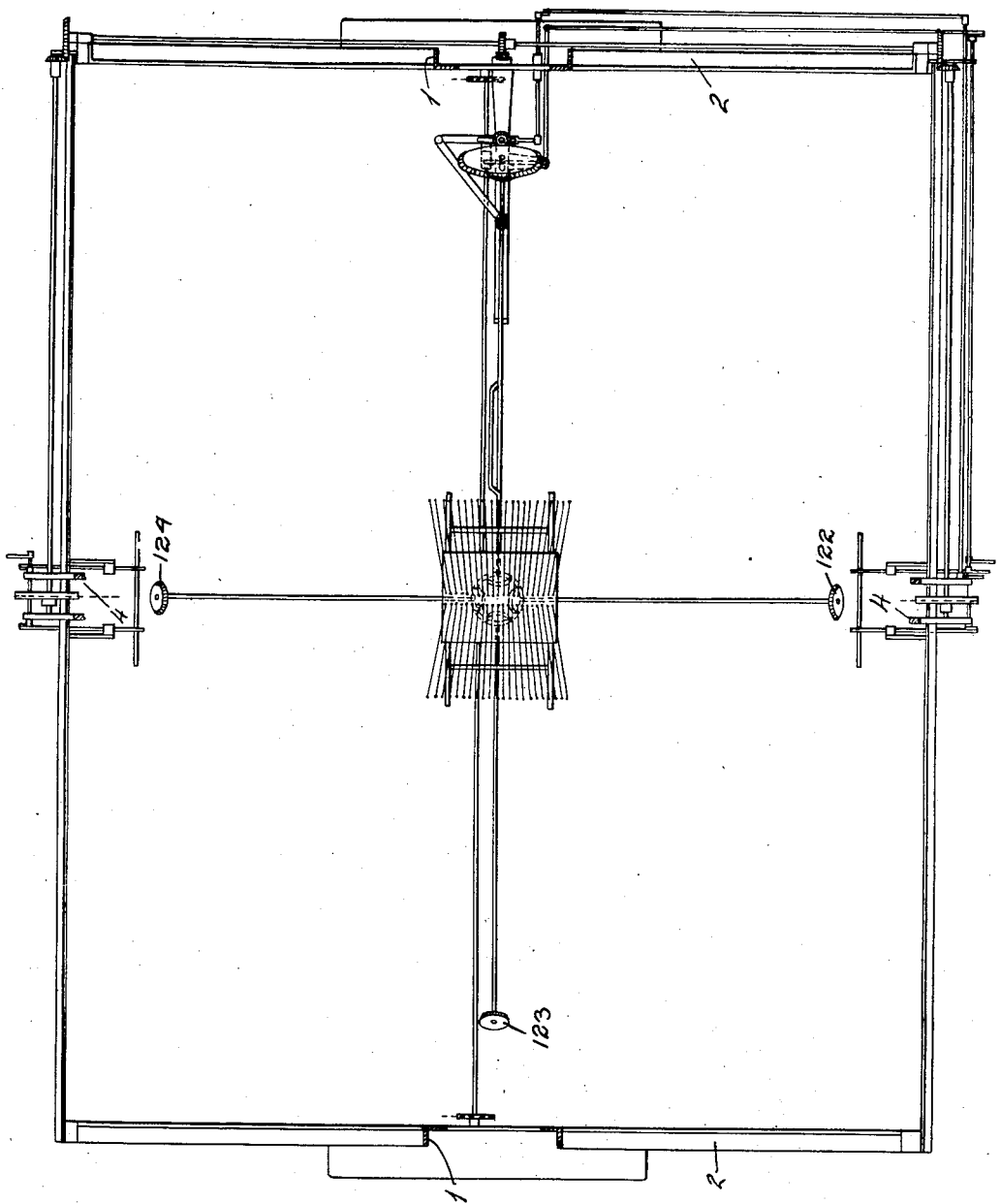

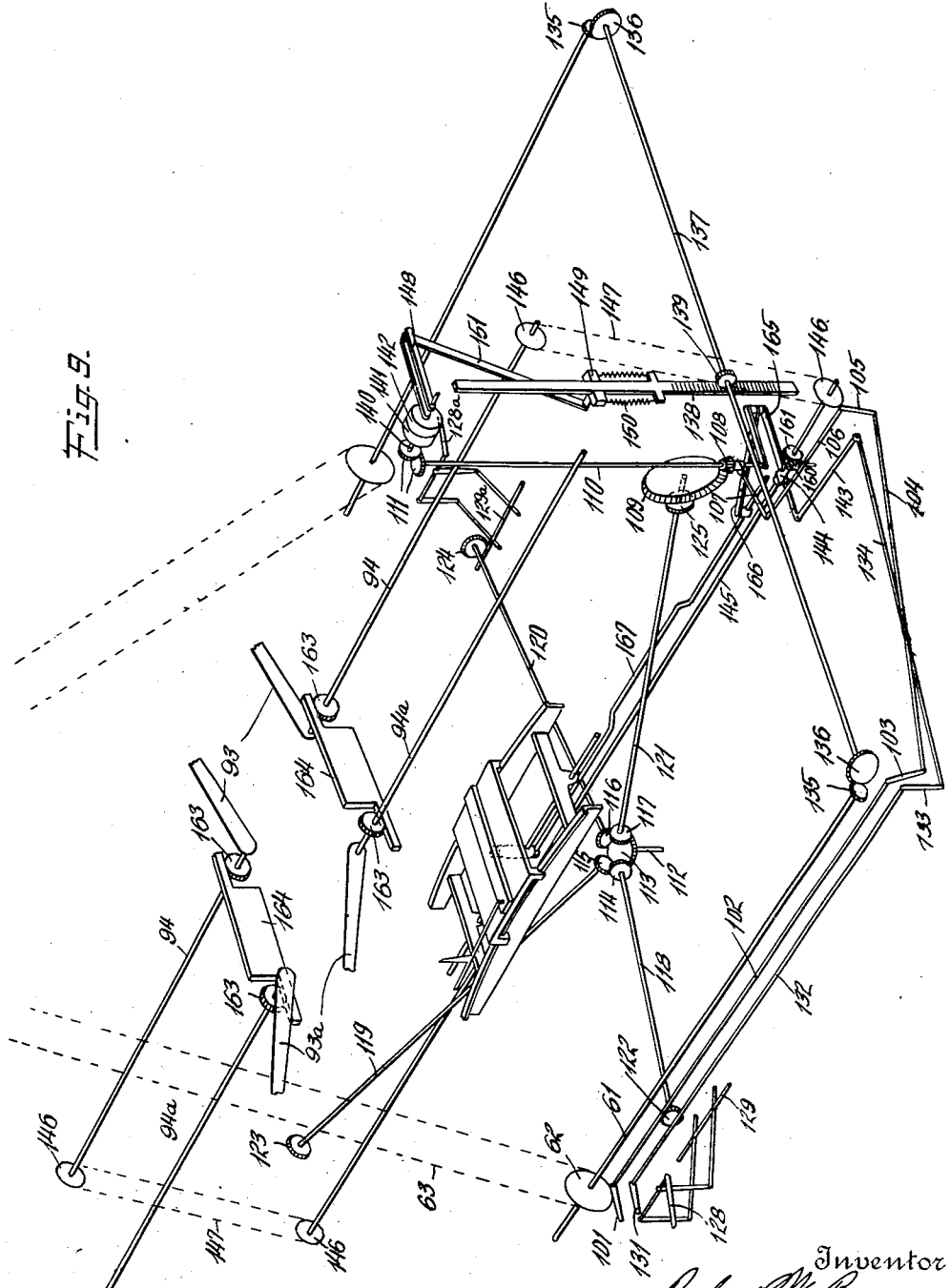

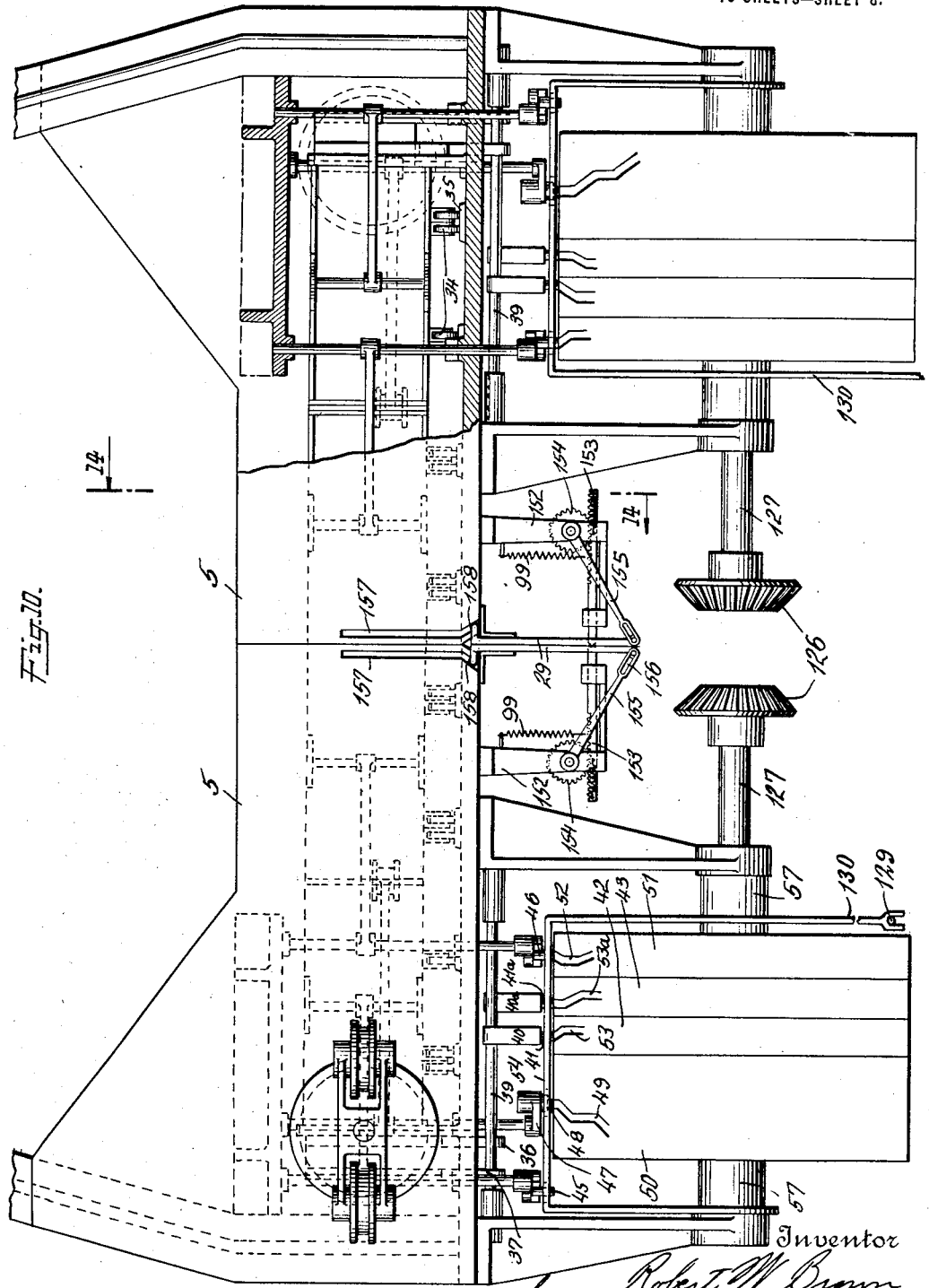

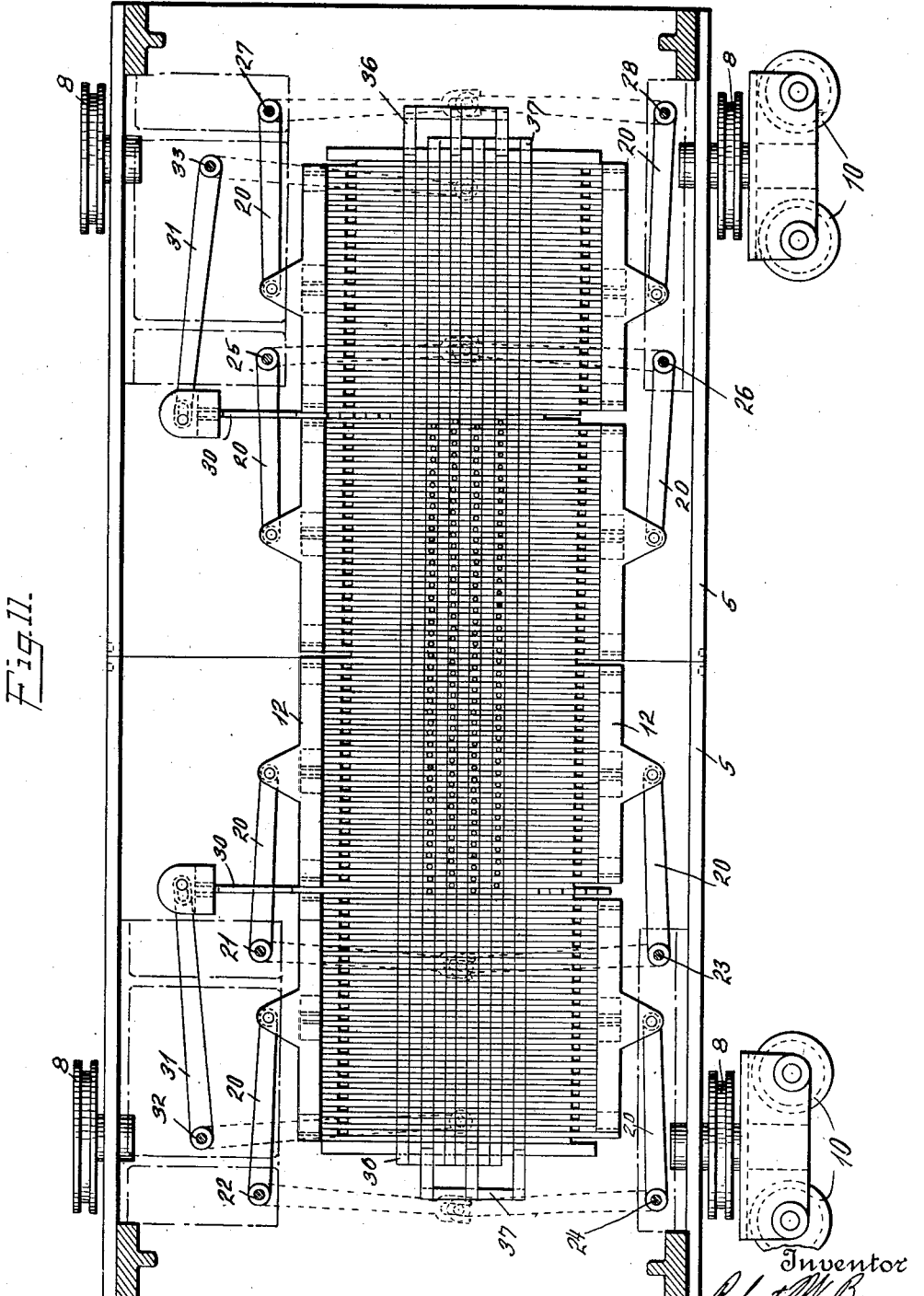

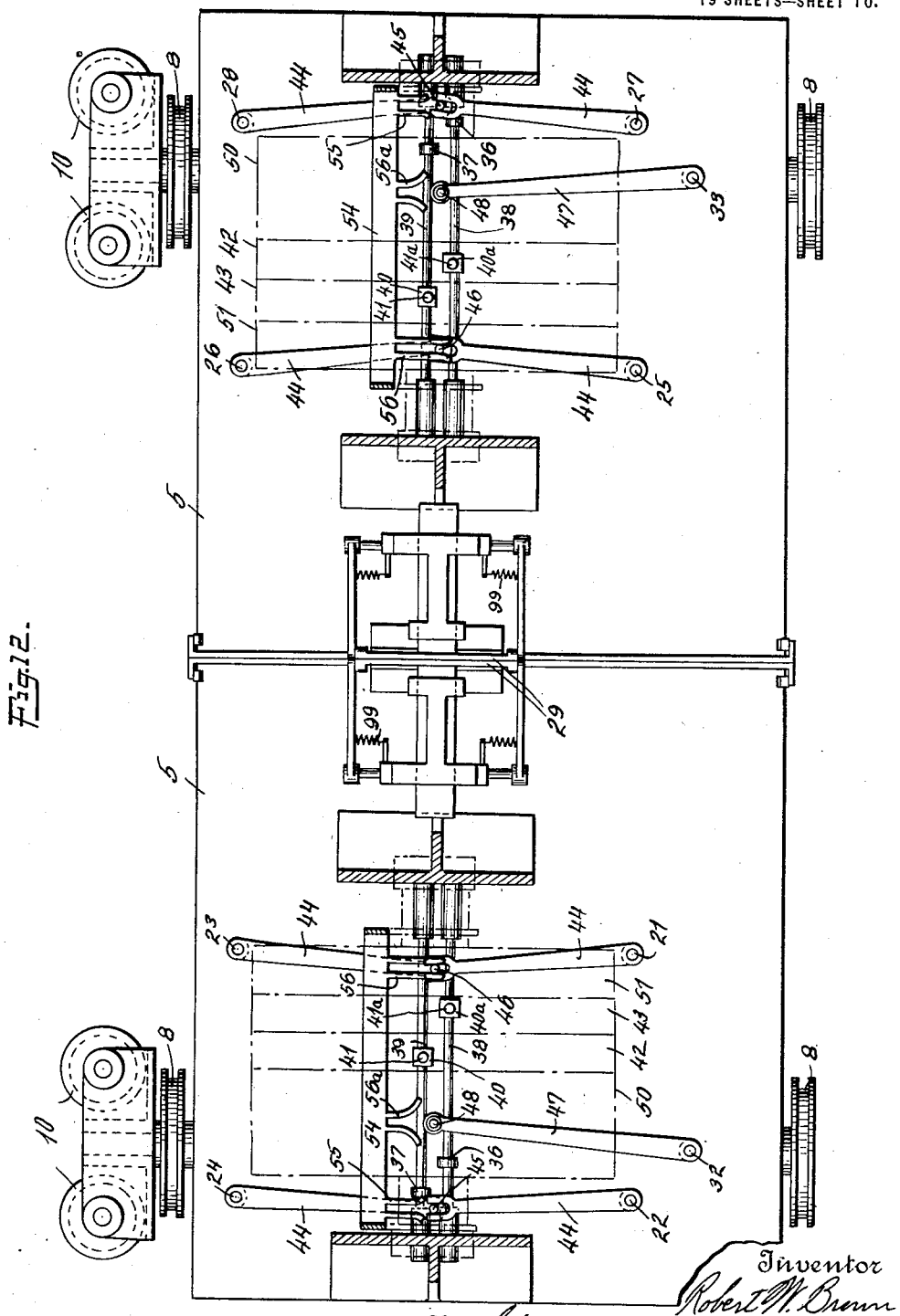

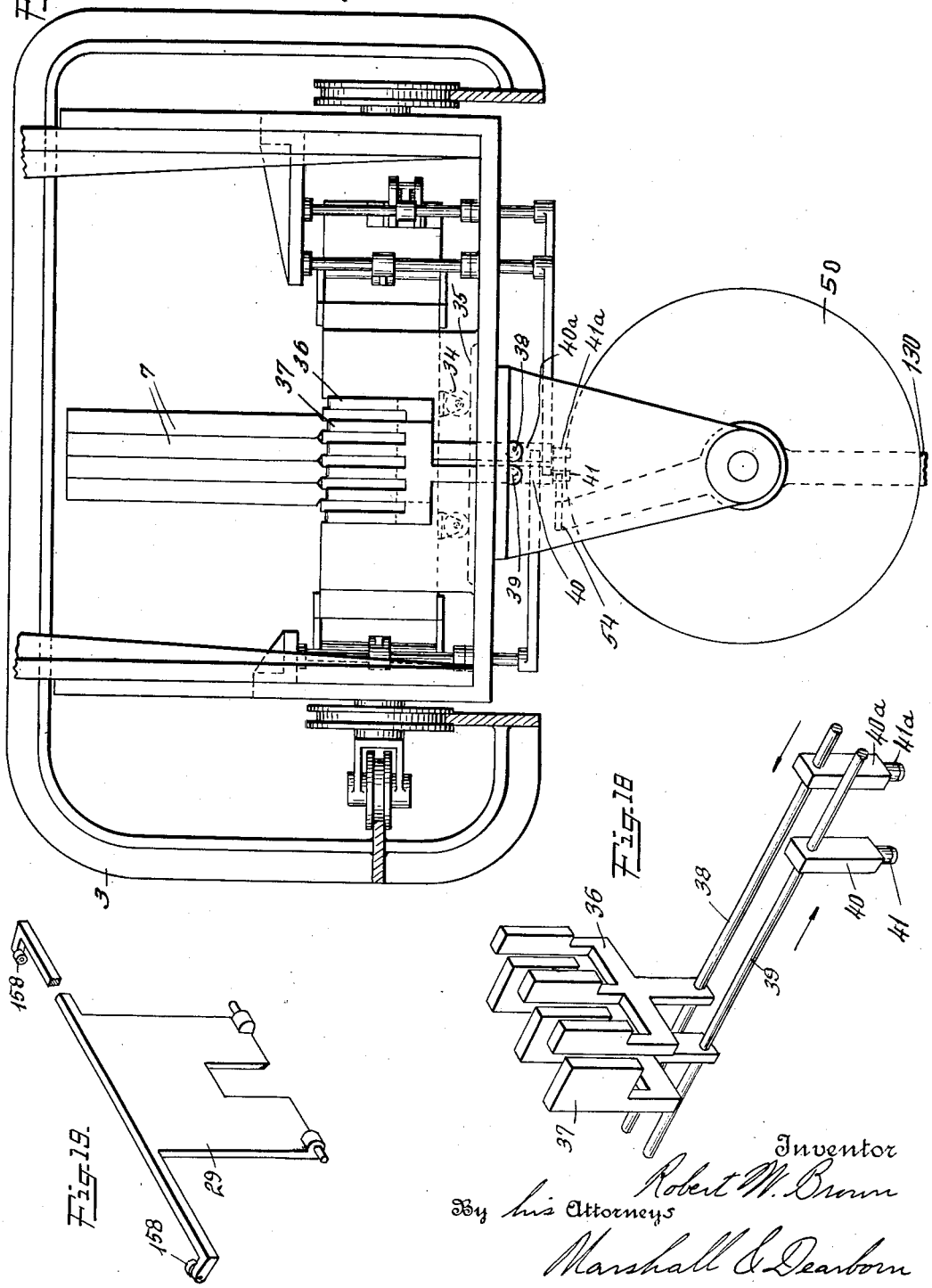

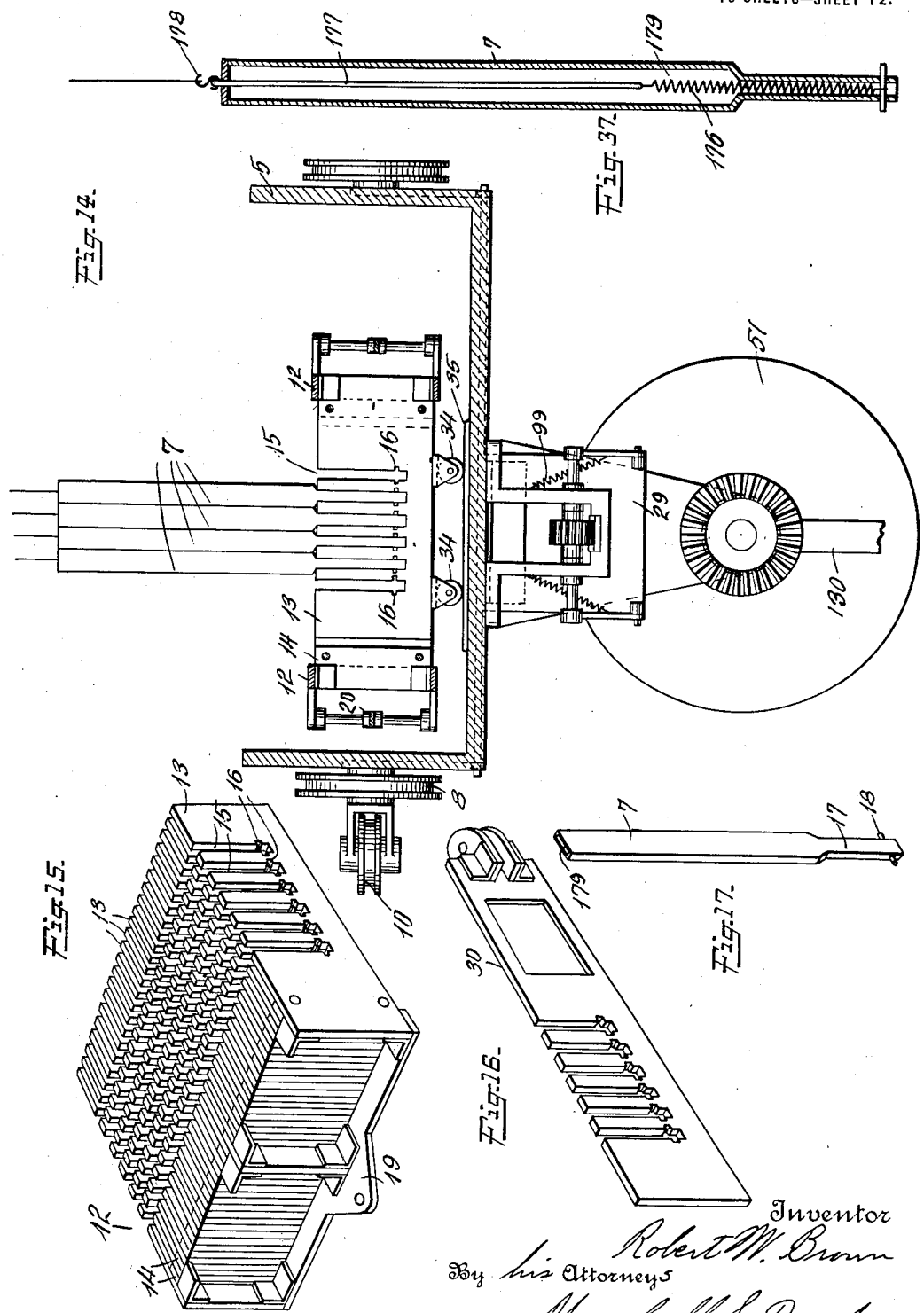

R. W. BROWN.
BRAIDING MACHINE.
APPLICATION FILED JUNE 14, 1917.
1,383,522.
Patented July 5, 1921.
19 SHEETS—SHEET 13.
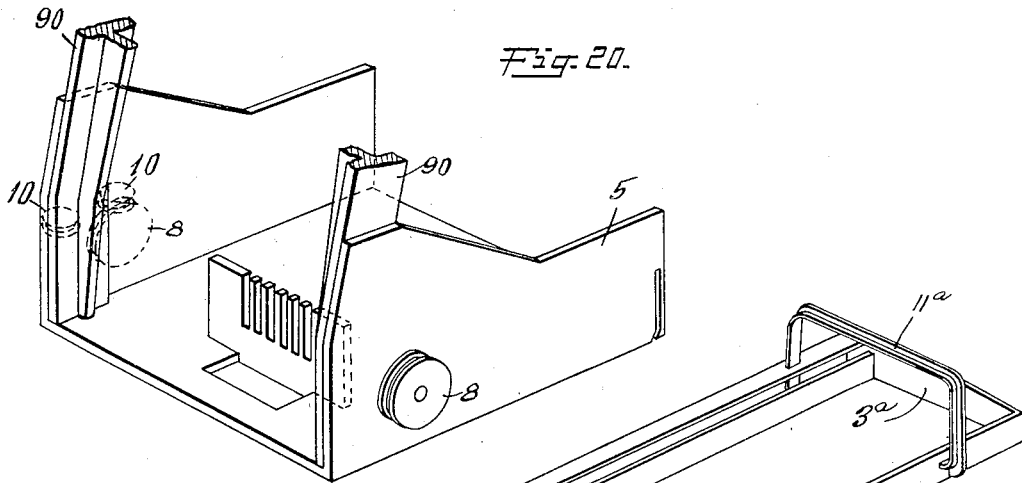
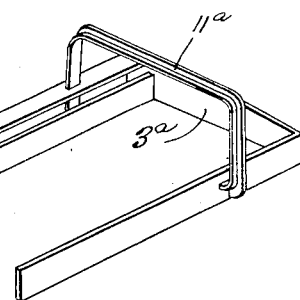
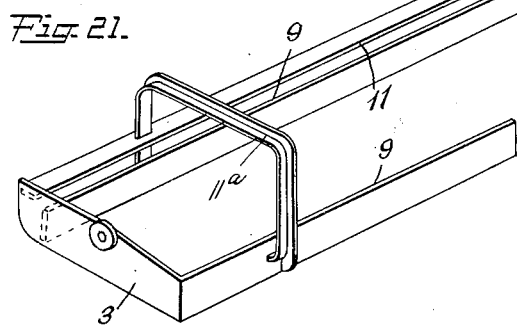
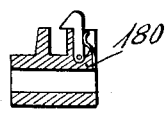
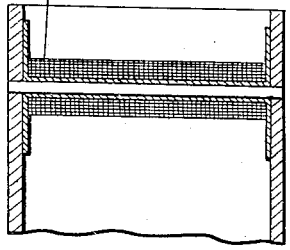
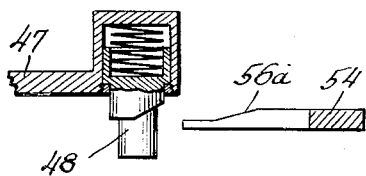
Inventor
Robert W. Brown
By his Attorneys
Marshall & Dearborn

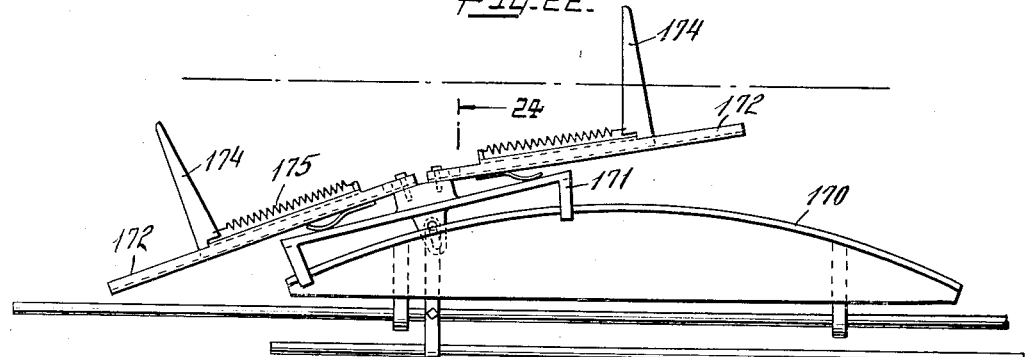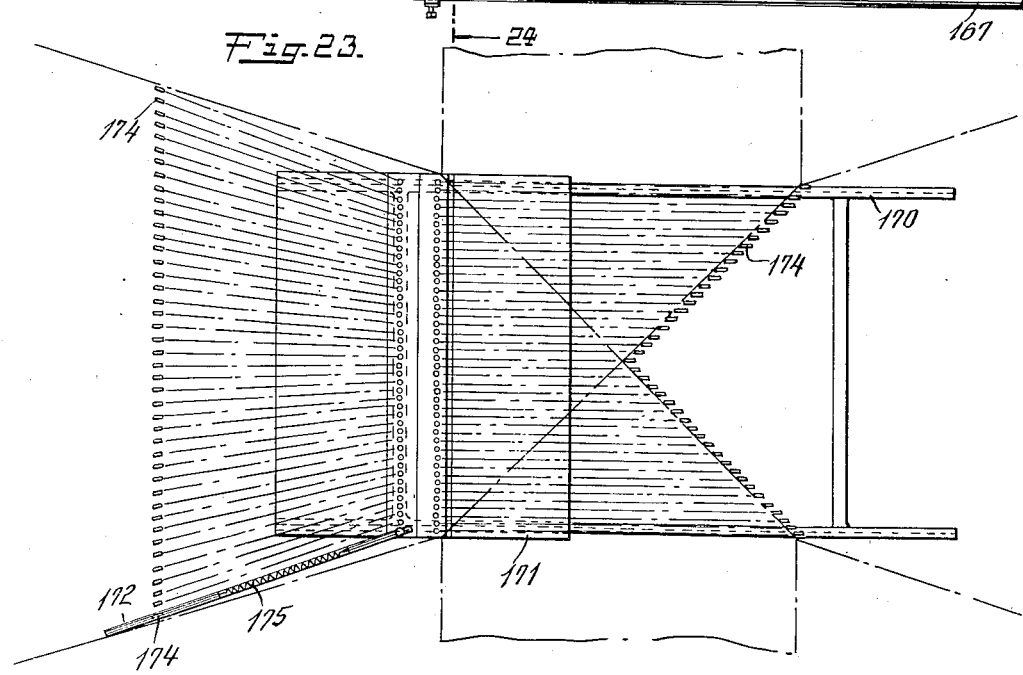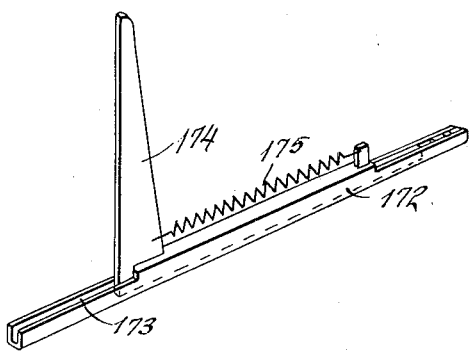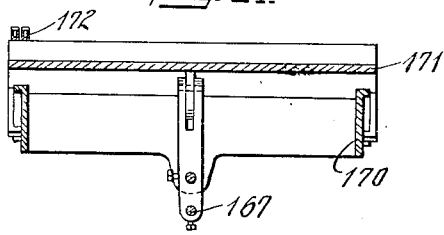

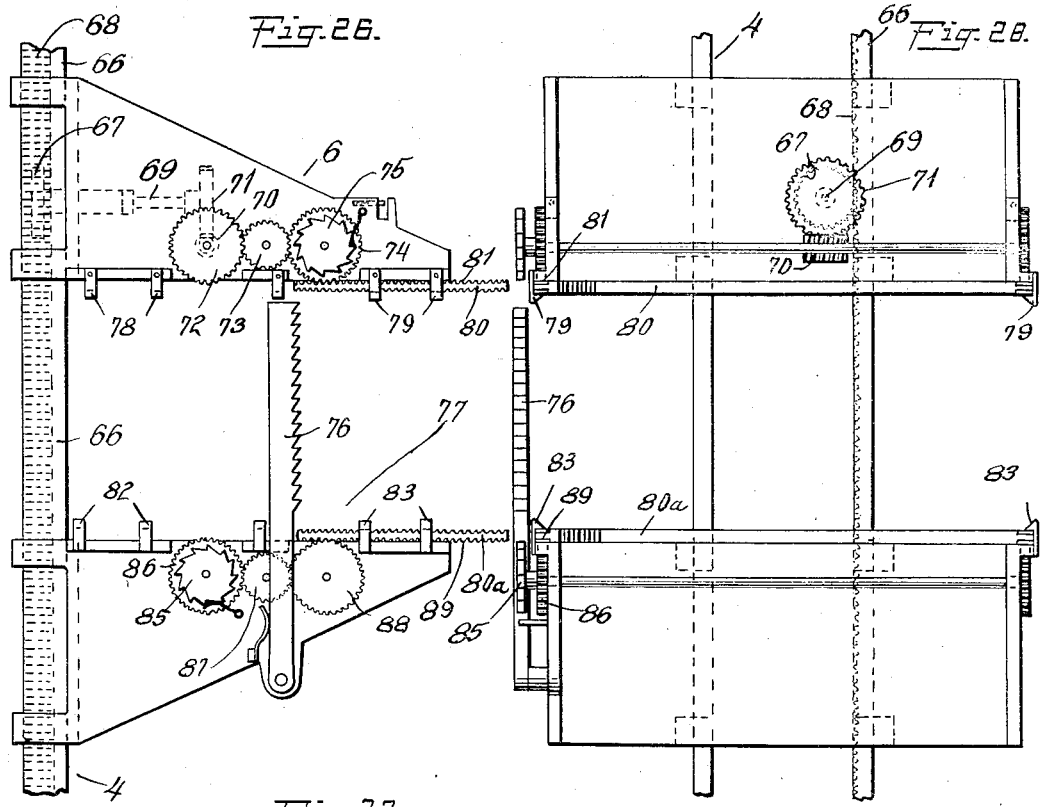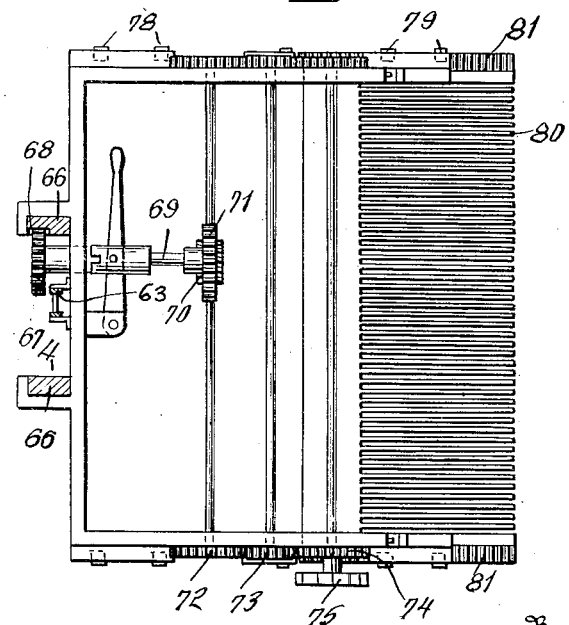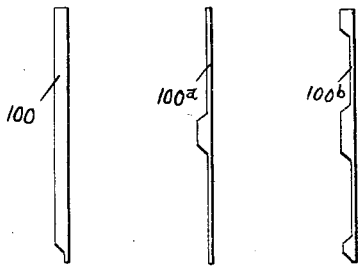

R. W. BROWN.
BRAIDING MACHINE.
APPLICATION FILED JUNE 14, 1917.
1,383,522.
Patented July 5, 1921.
19 SHEETS—SHEET 16.
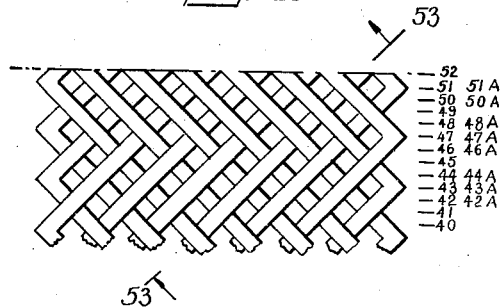
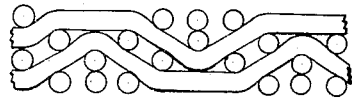
Inventor
Robert W. Brown
By his Attorneys
Marshall & Dearborn

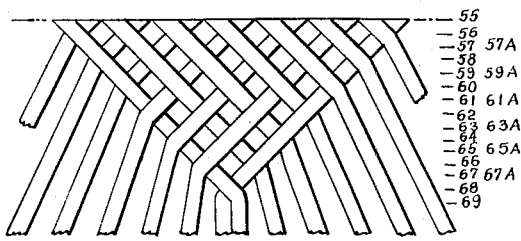

R. W. BROWN.
BRAIDING MACHINE.
APPLICATION FILED JUNE 14, 1917.
1,383,522.
Patented July 5, 1921.
19 SHEETS—SHEET 18.
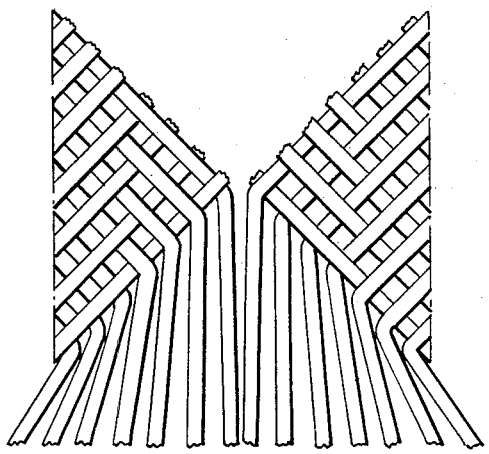
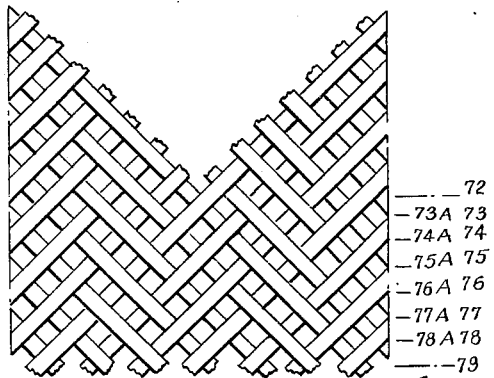
Inventor
Robert W. Brown
By his Attorneys
Marshall & Dearborn

R. W. BROWN.
BRAIDING MACHINE.
APPLICATION FILED JUNE 14, 1917.

1,383,522.

Patented July 5, 1921.
19 SHEETS—SHEET 19.

Inventor
Robert W. Brown
By his Attorneys
Marshall & Dearborn

UNITED STATES PATENT OFFICE.

ROBERT W. BROWN, OF NEW YORK, N. Y.

BRAIDING-MACHINE.

1,383,522.  Specification of Letters Patent.  Patented July 5, 1921.

Application filed June 14, 1917. Serial No. 174,700.

*To all whom it may concern:*

Be it known that I, ROBERT W. BROWN, a citizen of the United States, and a resident of New York, county of New York, and State of New York, have invented certain new and useful Improvements in Braiding Machines, of which the following is a specification, reference being had to the accompanying drawings, forming a part thereof.

My invention relates to the braiding of strands such as cords, threads, or wires into textile fabric and has special reference to the manufacture of relatively thick, narrow fabric having more than one ply, and to the closing of the ends of the same to produce a continuous belt or ring.

One object of my invention is to provide a simple and improved means of braiding that shall be useful in many ways but particularly adapted for producing narrow fabric of considerable thickness.

Another object is to provide a means of closing the ends of a length of fabric to produce a substantially uniform ring or belt free from appreciable irregularities.

Another object is to provide a comparatively simple machine for automatically braiding strands into a fabric of one or more plies.

Still another object is to provide a machine of the aforesaid character that shall be adapted to automatically close the ends of the fabric after a predetermined length has been braided, to produce a belt or ring of desired dimensions.

It is evident that my invention is not directly concerned with the uses to which the fabric may be put, but my improved method and machine are adapted to produce fabric rings or belts, which may be used to advantage as reinforcement in automobile tire shoes or the like.

In order that my invention may be thoroughly understood I will now proceed to describe the same in the following specification, and will then point out the novel features thereof in appended claims.

Referring to the drawings:

Fig. 2 is a side elevation of the same machine.

Fig. 3 is a front view showing the pin boxes and their cradles which form a part of the same machine, adjusted to intermediate positions through which they travel in closing or completing the ring or belt of the fabric.

A side view of the same parts in the same positions is shown in Fig. 4.

Figure 1:
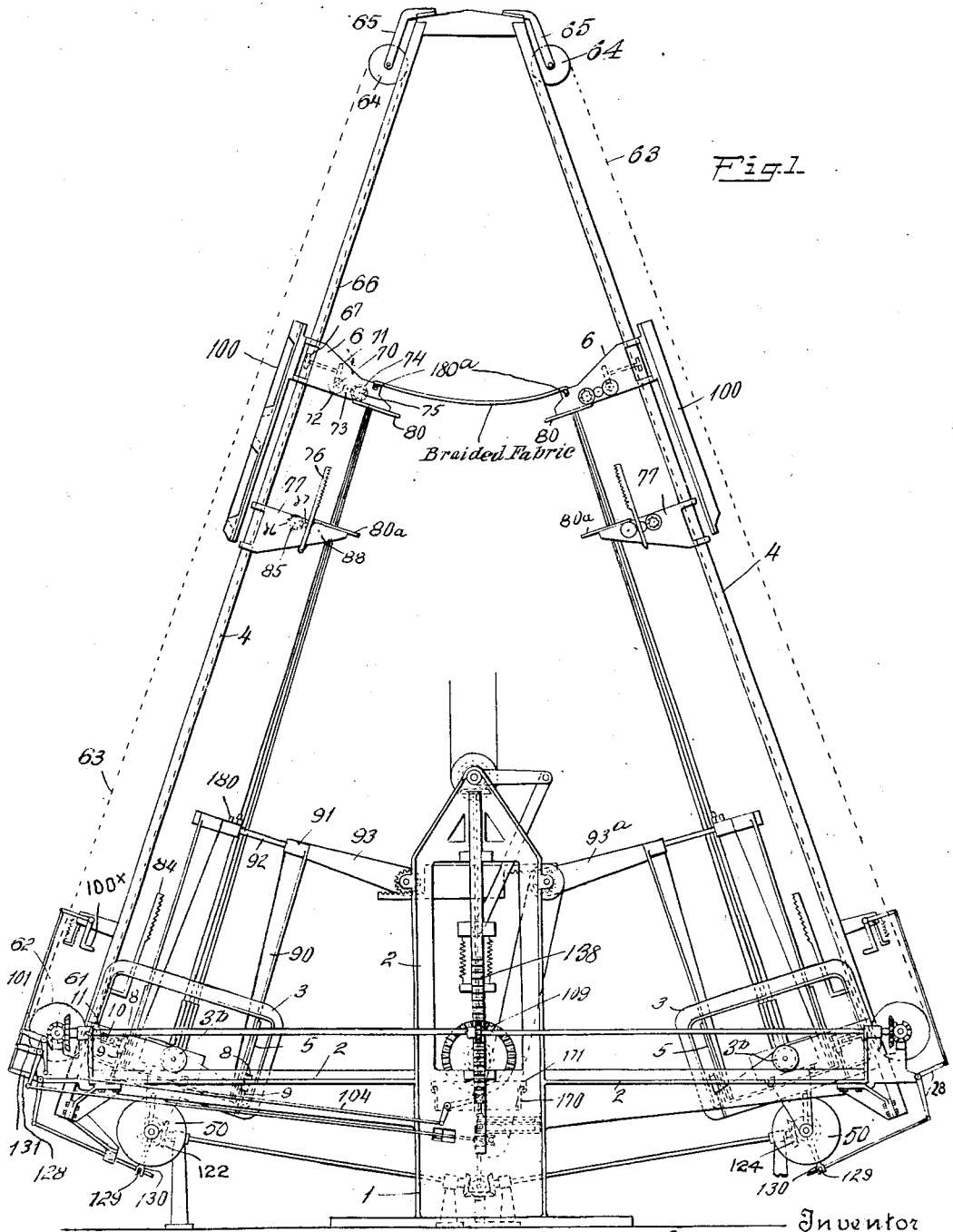
Figure 1 is a front elevation of a machine arranged and constructed in accordance with my invention.
Figure 72:
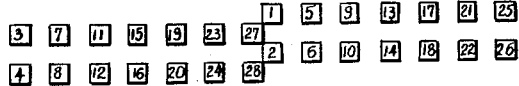
Figure 73A:
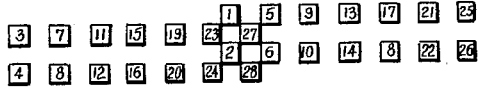
Figure 73:
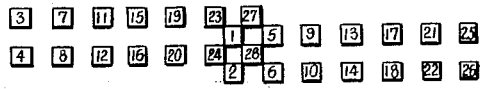
Figure 74A:
Figure 74:
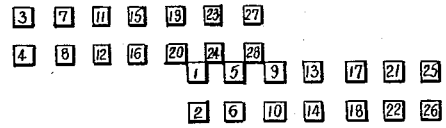
Figure 75A:
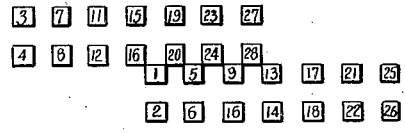
Figure 75:
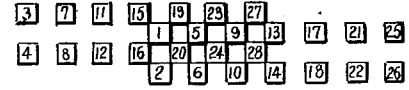
Figure 76A:
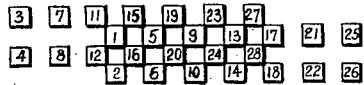
Figure 76:
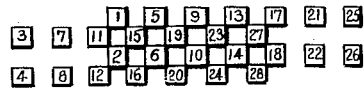
Figure 77A:
Figure 77:
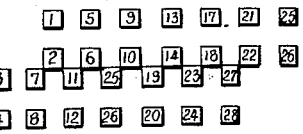
Figure 78A:
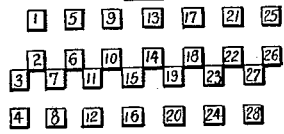
Figure 78:
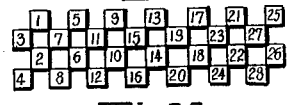
Figure 79:

Fig. 5 corresponds to Fig. 3 but shows the pin boxes and their carriages adjusted to their final positions in the closing-in operation.

Fig. 6 is a side elevation of the parts as shown in Fig. 5.

A plan view of the parts in the same positions is shown in Fig. 7.

Fig. 8 is a plan view corresponding to Fig. 7, except that the pin boxes and their carriages are removed to disclose the batten which is active in closing the ring, certain parts of the operating mechanism of the machine being shown in addition.

Fig. 9 is a partially diagrammatic perspective of the operating mechanism of the machine.

Fig. 10 is a side elevation on a larger scale showing the pin boxes in proper positions for either braiding the body of the fabric before the closing-in operation is commenced, or during the closing-in operation.

Fig. 11 is a plan view of the same parts.

Fig. 12 is a bottom plan view of the pin boxes showing a portion of the operating mechanism.

Fig. 13 is an end elevation of the pin box as used in the front of the machine.

Fig. 14 is a sectional elevation taken on the lines 14—14 of Fig. 10.

Fig. 15 is a perspective view showing one of the lateral pin actuators which forms a part of the pin box.

Fig. 16 is a similar view showing another portion of the pin box which is employed in the formation of the selvage of the fabric.

One of the pins is shown on a larger scale in Fig. 17.

Fig. 18 is a perspective view showing one set of longitudinal pin actuators which are adapted to effect motions at right angles to the actuators shown in Fig. 15.

Fig. 19 is a view showing one of the gates which becomes active as the pin boxes separate in moving to their closing-in position.

Fig. 20 is a perspective view of one of the pin box sections.

Fig. 21 is a perspective view showing the cradle in which the sections of the pin box are guided to their closing-in position.

Fig. 22 is a side elevation showing the batten for closing-in the ring.

Fig. 23 is an enlarged plan view corresponding to Fig. 8 and showing the closing-in batten.

Fig. 24 is a section taken on the line 24—24 of Fig. 22.

Fig. 25 is a perspective of one of the arms forming a part of the batten structure.

Fig. 26 is an elevation of one of the batten structures used in braiding the straight fabric and holding the braid in place, as viewed from the front of the machine.

Fig. 27 is a plan view of the same structure.

Fig. 28 is an elevation of the batten structure as viewed from the central plane of the machine.

Figs. 29, 30 and 31 are detail views of the cams which are depended upon for automatically effecting the closing-in operation.

Fig. 32 is a sectional detail of one of the latches for holding the web supporting pins during the closing-in operation.

Fig. 33 is a sectional detail of the cam structure of Fig. 12.

Figs. 34, 35 and 36 are diagrammatic perspective views illustrating the web in various stages of its completion.

Fig. 37 is a longitudinal section, showing one of the pins of Figs. 14 and 17 drawn to a relatively large scale.

Fig. 38 shows a modified pin structure adapted to embody a spool or reel instead of a yielding attachment.

Figs. 39 to 53 inclusive are diagrammatic views drawn to a relatively large scale, illustrating one complete cycle of strand movements effected in producing a straight braided web by means of a machine of the character illustrated in the previous figures.

Figs. 54 to 69 inclusive are diagrammatic views corresponding to Figs. 37 to 52 but showing the strand movements during the formation of the wedge or taper ends of the fabric preliminary to closing in.

Figs. 70 to 79 inclusive are another set of diagrams, illustrating the strand movements effected during the closing-in operation.

Variations in the cycle and kind of strand movements may of course be effected within the spirit and scope of my invention and will be dependent upon the number of plies used to make up the desired thickness of the web, the width of the web, and the purpose for which the web is intended.

*Brief general description.*

Special reference may first be had to Figs. 1 and 2, where the machine is shown as a whole. It comprises in general a pair of spaced supports or brackets 1, an interposed horizontal frame 2, providing track rails or guideways for a pair of pin box cradles 3, pivotally suspended pin boxes 5, a superstructure composed of a pair of inclined guideways 4, a pair of batten carriages 6 thereon ways, a closing-in batten structure (see Fig. 22), together with suitable driving, gearing and operating mechanisms.

*Brief description of general operation.*

The machine shown and described herein, is intended for the purpose of braiding suitable strands into fabric and is adapted to produce a fabric having any number of plies, dependent upon the thickness desired. It may be used for producing a web of indefinite length but is arranged and adapted for closing the ends of the web to produce an endless belt. The machine is set to close-in automatically when the straight away braiding has progressed to a predetermined extent and is therefore particularly useful for producing a plurality of rings or belts of uniform size which may, for example, be used as reinforcements and means for holding rubber in the manufacture of tire shoes for automobiles or the like.

The machine comprises two sides which correspond to each other and which operate concurrently. The batten carriages 6 are near the top of the inclined guideways 4 and the strands of which the web is to be formed are stretched over transverse rods on the batten carriages and at their respective ends are secured to pins or spools which are mounted in suitable actuators within the pin boxes 5 as hereinafter explained. During the straight-away braiding of the web the pin boxes are stationary and the pins (or the spools which may be substituted therefor) are suitably shifted within them to effect the braiding or interweaving of the strands. When the braiding process has progressed to a predetermined extent the pins or spools within the boxes are first permitted to spread by modified action of the selvage forming device to divide the strands at each end of the web into two groups. The braiding then progresses forming points as shown in Fig. 35. The pin boxes are then separated and brought together in a new relation being swung to positions in which a box from one side of the machine is coöperating with a box from the opposite side. The pins as newly grouped are now suitably shifted to braid the strands and produce a splice as shown in Fig. 36. The closing-in process is thus completed and a continuous ring or belt of fabric is produced.

*Pin boxes.*

Referring particularly to Figs. 10 to 21 inclusive, each pin box group is composed of two pin boxes 5 which are arranged end to end and act like a single structure during the straight away braiding operation up to the time the closing-in operation begins. One of the boxes is shown in perspective in Fig. 20, and each of the sections as here indicated is provided with a pair of wheels or rollers 8 which are adapted to run on the edges 9 of the pin box cradle 3 which constitute track rails, and a pair of rollers or wheels 10 which are adapted to coöperate with a guideway 11 on the side of the cradle 3 as clearly shown in Fig. 21. The axes of the wheels 10 are in a plane parallel to the side of the box while the common axis of the wheels 8 is parallel to the bottom of the box.

The wheels 10 particularly coöperate with the guideway 11 when the position of the box sections is adjusted preparatory to closing-in, as hereinafter explained.

Since each group of pin boxes is composed of two boxes which are similar in all respects, a detailed description of one box will be sufficient to an understanding of the group. Within one of the boxes, as shown in Figs. 11 and 14, are a pair of coöperating or interlocking actuators 12. Each of these actuators, as shown in Fig. 15, comprises a plurality of spaced plates 13 which are affixed to each other and may be integral if desired. The two actuators of each pair are fitted together, with the plates 13 of one extending into the spaces of the other as shown in Fig. 11. I prefer to build up the structure out of plates having spacers 14 between them at one end. Each of the plates of which the actuator is composed, has a plurality of rectangular notches 15 having small lateral recesses dividing each plate into fingers which are provided with key slots or notches 16 near the bottom of the notches 15.

The notches 15 for the several plates of the actuator are carefully alined so that when the pair of actuators are moved into register the effect is that of a solid block having a plurality of longitudinal slots with keyways near the bottom of each slot. The slots are adapted to receive the shanks 17 of the pins 7, each pin being provided with a key 18 which fits into the keyways 16. The arrangement of parts is such that the pins may be easily moved back and forth in the slots formed by the notches 15, but cannot be lifted out unless they are first moved out of the slot at one end.

The pins are not only arranged to slide forth and back in the slots provided by the notches 15 but furthermore, correspond in thickness to the plates 13. Consequently the pins may fill the notches 15 and move with the actuator plates 13 in a direction at right angles to the first-named slots.

The actuator notches 15 are adapted to register in any one of a plurality of positions and the pins may be adjusted first with the plates 13 and then along one of the slots formed by the registering notches 15. Each of the actuators 12 is provided with a perforated lug to which a bell crank lever 20 is pivotally connected.

For each complete group of two boxes there are eight actuators 12 and a corresponding number of bell crank levers 20. These levers may conveniently be distinguished by referring to their pivots which are designated 21 to 28 inclusive.

At the adjacent open ends of the pin boxes there are arranged gates 29 which are automatically closed as the pin box sections separate. By this means the pins are held in position in their boxes when the boxes are shifted to their closing-in positions.

As shown in Figs. 17 and 37 each of the pins 7 is hollow so as to provide a chamber 179 in which is disposed a spiral spring 176 and a cord 177. The spring is attached to the pin in the bottom of the recess or chamber 179 and is secured at its outer end to the cord of link 177. At the outer end of the cord is a hook 178 to which one of the threads or strands to be braided is connected.

I prefer to use double threads or strands for single braiding so that the loops of the double threads may accordingly engage the hooks.

The arrangement of parts is such that the cords 177 may be pulled out to a greater or less extent from the chamber according to the requirements of the operation of the machine; for example, when the pin boxes are swung from their straight-away braiding position to their closing-in position the cords will be drawn away from the pins to a greater or less extent. The springs 176 will in each instance compensate for the motion of the pin and the hook will be automatically returned to its initial position in engagement with the end of the pin when the web is completed and the threads are cut. Furthermore the spring connections insure a more or less uniform tension in the ends to allow for irregularities which may occur during the straight-away braiding operation.

Two of the actuators 12 of each pin box are adjacent to the open end of the box where the gate 29 is located and the other two at the opposite end of the box, an edge forming plate 30 being interposed between the two sets of actuators. The two selvage forming plates 30 for each group of boxes are actuated by bell crank levers 31.

Each of the actuators 12 is preferably provided with casters or wheels 34 which rest upon a finished surface 35 in the bottom of the pin box. The slots formed by the registering actuators are completely filled with pins, some active and some constituting fillers; the pins in the two central actuators are active, a strand or thread being attached to each alternate pin. This is clearly shown in Fig. 11 by the small circles which designate the pins to which threads are attached or connected.

The actuators which are non-adjacent are also filled with pins but none of the pins to which strands are connected enter the spaces formed by these actuators until the closing-in operation is begun. The actuators are in fact only operated during the closing-in operation.

The actuators 12 as already explained, produce transverse motions of the pins relative to the boxes and in addition there is provided a pair of longitudinal actuators 36 and 37 at each end of the slots. As clearly shown in Fig. 11, these longitudinal actuators are adapted to engage alternate rows of pins so that if there are six rows engaged by the actuators three of them are engaged by one and three by the other. The actuators 36 and 37 are shown more in detail in Fig. 18, and are attached to rods 38 and 39. These rods extend longitudinally below the boxes and attached at intermediate points in their length are blocks 40 and 40$^e$ having projections 41 and 41$^a$ which are adapted to engage grooves provided in a pair of governing cams 42 and 43. Thus the pins may be shifted longitudinally of the pin boxes and between longitudinal shifts the actuators 12 may produce lateral shifts to effect the desired inter-weaving or braiding of the strands.

The motion is always positive because the filler pins together with the strand pins completely fill the spaces as above set forth.

The connections for driving the actuators 12 are shown in the bottom plan view of Fig. 12, which may readily be compared with Fig. 11 since the pivotal axes of the bell crank levers in Fig. 11 are all shown and correspondingly designated in Fig. 12. The arms 44 of the bell crank levers 20 extend inwardly in pairs and are connected by lost motion connections to a pair of pins 45 and 46. The pin 46 engages a groove 52 in a cam 51.

The bell crank lever 31 has an inwardly extending arm 47 provided with a pin 48 to engage the annular cam groove 49 of a cam 50 (Fig. 10). This cam is adjacent to cams 42 and 43 which respectively govern the movement of the actuators 36 and 37, being provided with cam grooves 53 and 53$^a$ which are engaged by projections 41 and 41$^a$ of the blocks 40 and 40$^a$.

The pins 45 and 46 are interconnected and are concurrently actuated by a bar 54 having forked projections 55, 56 and 56$^a$ which engage the respective pins 45, 46 and 48.

The bar 54 has the form of a yoke as shown in Fig. 10 and is mounted on hubs 57 so that it is free to swing and carry the forked projections 55, 56 and 56$^a$ into and out of engagement with the pins 45, 46 and 48. It is also free to move longitudinally in response to the movement of the pin 46, the arrangement being such as to make the motion of the arms 44 and 47 and bell crank levers 20 and 31 correspond to that of the actuators 12. This only occurs, however, during the closing-in operation and will be explained more fully in that connection. For the straight-away braiding process the cam 50 is necessarily arranged to produce a greater movement of the plate 30 than is essential to the actuators 12, because the plate 30 is relied upon to carry one of the threads over from the upper layer to the lower layer of the fabric in producing the edge or selvage.

Batten carriage.

Referring more particularly to Figs. 1, 2 and 26 to 32 inclusive, the frame 2 of the machine supports a substantially horizontal shaft 61. Mounted on this shaft is a sprocket wheel 62 over which an edless belt or chain 63 travels. It is supported near the top of the superstructure by a sprocket wheel 64 which is an idler sprocket and is mounted on a pivot bracket 65.

The batten carriage 6 is mounted to slide on inclined guide bars or rods 66 of the superstructure, and is provided with a gear wheel 67 which meshes with rack teeth 68 on one of the bars 66. The gear 67 is mounted on a shaft 69 which is geared through a worm and wheel 70 and 71 and spur gears 72, 73, and 74 to a ratchet wheel 75.

The arrangement of parts is such that the weight of the carriage is not sufficient to overhaul the gears and consequently the carriage remains fixed until the ratchet wheel 75 is actuated whereupon the carriage is fed a predetermined distance, depending on the design of the gears and the length of an actuating bar 76 connected to a reciprocating holder 77 which coöperates with the carriage. The carriage is relatively stationary and is fed forward step by step and is provided with a plurality of depending hooks or latches 78 and 79 which are adapted to hold the batten 80 after it has been elevated by the reciprocating holder 77.

The batten 80 has rack teeth cut in its edges as shown at 81 which are adapted to mesh with the gear wheels 74 and 72 of the gear train so that when the gear train is actuated the batten 80 is slid inwardly from the hooks 79 into position on the hooks 78. The batten holder is mounted to slide freely on the guide bars 66 and has upwardly extending hook projections 82 and 83 which are adapted to hold a batten 80$^a$ which corresponds to batten 80. The batten is made in one piece preferably in the form of a comb.

The reciprocating holder 77 is connected to the chain 63, the sprocket 62 being driven first in one direction and then in a reverse direction to produce an up and down movement of the holder 77.

The reciprocating movement of the chain sprocket 62 may be effected by any suitable mechanism such as, for example, that shown in Figs. 1 and 9. The shafts 61 to which the sprockets 62 are attached are provided with beveled gears 135 and are driven by gears 136 on a shaft 137. This shaft is actuated by a rack 138 which engages a gear 139 on the shaft 137.

The operating mechanism of the machine as more fully explained hereinafter is driven by any suitable motor (not shown) belted to a shaft 140 having fixed and loose pulleys 141 and 142. Secured to the same shaft is a crank arm 148 which is connected to a guide block 149 by a link 151. The rack 138 is yieldingly connected to the guide block 149 by springs 150 the arrangement of parts being such that when the crank shaft 140 rotates, the rack is reciprocated and produces a reciprocatory movement of the shafts 61, the sprocket wheels 62 and the chains 63.

The distance traveled by reciprocating batten holder or carriage 77 is determined by the position of batten carriage 6 which advances step by step and constitutes a moving limit which gradually reduces the extent of the motion.

When the holder 77 (Fig. 26) approaches the lower limit of its travel a relatively stationary rack bar 84 engages and actuates a ratchet wheel 85 which is mounted on the holder 77 and is operatively connected to a chain of gears 86—87—88. The gears 86 and 88 are adapted to mesh with rack teeth which are provided in the batten 80ª at 89, the arrangement being such that when the ratchet wheel 85 is actuated, the batten 80ª is slid away from the guideways 66 and is held under the latches 83.

It is now in position to engage the strands from which the fabric is being braided (the completed portion of the web being designated 1 in the drawings) and as the holder 77 moves upwardly it carries the braid or inter-twining up to the previously completed section of the fabric adding one or more rows of stitches. During the final upward movement the rack bar 76 acts upon the ratchet 75 and feeds the carriage 6 forward as already explained. It also actuates the gears 72 and 74 and draws in the batten 80 just as the batten 80ª arrives to take its place. The batten 80ª is released from the latches 83 which are brought into engagement with the edges of the carriage 6 and is held by the latches 79 which are momentarily released by the batten itself as it is pressed upwardly against their beveled edges.

The latches 78 which now hold the batten 80 are similarly released by the upward movement of the holder 77 since they are cammed open by the edge of the holder in its upward movement. The batten 80 momentarily presses back the latches 82 and is held in position on the reciprocating holder 77.

Each of the latches is pivoted and spring-pressed like the latches 180 one of which is shown in detail in Fig. 32.

The completed portion of the web is carried by web supporting pins 180ª which are attached to the batten carriages 6 and they are engaged by the latches 180 when the straight-away braiding is finished and during the closing-in operation when they are very advantageous in preventing the displacement of and injury to the web.

Thus the battens are interchanged, one of them being brought up each time while the other is forced backwardly and is transferred from the carriage, to the reciprocating holder. It is then forced out again as just explained when the reciprocating holder reaches the lower end of its movement and is in position to engage the threads near the pin boxes, the movement of the batten being timed to coöperate with the braiding.

It is evident from the foregoing that there are two battens or combs which are used in alternation on the reciprocating holder 77 where each batten is first moved inwardly (to the right in Fig. 26) from a position under the latches 82 to a position under the latches 83. This movement is accomplished by the actuation of the train of gears 86, 87, 88 by the engagement of the rack 84 with the pawl 85 as the reciprocating holder reaches the bottom of its downward stroke. The batten is then in the position of Figs. 26 and 27 and engages the strands of the fabric.

The next upward movement of the reciprocating holder 77 moves the other batten on the batten carriage 6 (to the left in Fig. 26) from a holding position to an inactive position just before the first batten comes to take its place. As each batten comes upward in action it pushes back the braid and adds one row to the braided web.

*The closing-in mechanism.*

The machine has been described hereinbefore with reference to only such parts as are utilized in the braiding of the bulk of the fabric, herein designated straight-away braiding, without any reference to the closing-in mechanism which will now be discussed. For the straight-away braiding of the fabric, the pin boxes remain in fixed positions but for closing-in, their positions must be changed and the arrangement of the structure is largely determined by the fact that it is adapted to automatically close the ends of the fabric to produce an endless belt.

The pin box cradles 3 constitute important parts of the closing-in mechanism because they are arranged to guide the pin boxes, and each cradle comprises the spaced side rails 9, end pieces 3ᵃ having rollers or wheels 3ᵇ supported thereon, a single flange rail 11 at one side and a pair of spaced yokes 11ᵃ which tie the parts together and extend closely over the sides of the pin boxes 5. The cradles 3 are mounted on the horizontal frame 2 of the machine, the rollers 3ᵃ coöperating with the rails 2ᵃ thereof, as clearly shown in Figs. 1 to 6 inclusive.

The arrangement of parts is such that each cradle has a pivotal mounting about a substantially central longitudinal axis determined by the axes of the rollers 3ᵇ. However, it is free to ride in a transverse direction on the rails 2ᵃ of the stationary frame like a car. As explained hereinafter the pin boxes are guided in their movement by the cradles on account of the coöperation of the rollers 8 and 10 with the side rails 9 and the flange rail 11.

The batten carriages on the two sides of the machine are interconnected and move concurrently, and the closing-in mechanism is dependent upon the progress of the batten carriages 6 to which cams 100, 100ᵃ and 100ᵇ are attached.

The batten carriage 6 as already explained, is advanced step by step as the braiding process proceeds and when it finally approaches the lower limit of its travel, the cams 100, 100ᵃ and 100ᵇ, (Figs. 2, 29, 30, 31), which are attached to it, actuate in a predetermined succession, a plurality of triggers 100ˣ (Figs. 1 and 2) connected to bell crank levers which are clearly shown in the diagrammatic view Fig. 9. Of these levers the first to be actuated by the cam is that designated 101 which, acting through a shaft 102, a lever 103, a link 104, a lever 105, and a shaft 106, actuates a lever 107. This lever when thus actuated moves a bevel pinion 108 out of engagement with a gear wheel 109.

The pinion 108 is mounted on a shaft 110 which is operatively connected to the shaft 140 by gears 111. The shaft 110 is therefore rotated whenever the driving shaft 140 is in operation. There is a central idler shaft 112 to which a bevel gear 113 is secured. A plurality of gears 114, 115, 116 and 117 all mesh with the gear 113 and are affixed to shafts 118, 119, 120 and 121 which radiate from the central shaft 112. The bevel gear 109 is secured to the shaft 121 and consequently when the gears 108 and 109 are in mesh all of the shafts 118—119—120 and 121 are in operation.

These shafts have gears 122—123—124—125 near their outer ends which are adapted to coöperate with and drive pin box gears 126 which are secured to the cam shafts 127.

The pin box gears 126 mesh with gears 122 and 124 during the straight-away braiding and with gears 123 and 125 during the closing-in process as hereinafter explained under the operation of the machine.

It is therefore evident that the first step in the automatic closing-in action is to stop the gears which drive the pin box cams and halt the braiding process. The next action of the cam 100 is to actuate a lever 128 which in turn actuates a link 129. A corresponding lever 128ᵃ and link 129ᵃ are provided on the opposite side of the machine and are similarly actuated, the batten carriage being provided with a cam 100ᵃ for this purpose. Each of these rods or links is adapted to engage a pair of lever arms 130 which are extensions of the bars 54 and when actuated swing the bars 54 about the cam shafts 127. Furthermore, the bars 54 are adapted, when the lever arms 130 are actuated, to raise the pin 48 out of the cam groove 49 and connect it to operate concurrently with the pins 45 and 46 (see Figs. 12 and 33).

It is now evident that the lever arms 44 and 47 will all be moved in response to the groove 52 of cam 51. Thus the plate 30 which was previously moved independently to form the selvage of the fabric, is now moved with the actuators 12. As fully explained hereinafter, this permits the pins to be spread out into the outer sets of actuators 12.

The cam 100 next causes the bevel gear 108 to be thrown into mesh with gear 109, which causes the braiding action to continue but spreads the pins from the inner actuators 12 through the inner and outer actuators in such a way that as the braiding operation continues the fabric tapers down to a point at each end as illustrated in Figs. 7 and 35.

When this point is reached the cam 100 again actuates the bell crank lever 101, releases the gear 108 and stops the braiding action.

The cam 100 next actuates the lever 131 which is connected through a shaft 132, a lever 133, and a link 134 to a clutch lever 143. The lever 143 when thus actuated sets the clutch 144 and establishes a driving connection from the shaft 110 through gears 160 and 161 and the clutch 144 to the shaft 145. This shaft is connected by sprocket wheels 146 and chains 147 to the shafts 94 to which the arms 93 are secured. A corresponding set of shafts 94ᵃ to which arms 93ᵃ are secured, are operatively connected to the shafts 94 by gears 163 and rack bars 164.

The pin boxes are thus swung from the position of Figs. 1 and 2 through the position of Figs. 3 and 4, into the position of Figs. 5 and 6.

It is evident that whereas the two boxes suspended from the arms 93 on the shafts 94 were working in conjunction during the straight-away braiding, the two boxes now coöperating are those suspended from the arms 93ᵃ which are directly opposite on the shafts 94ᵃ. The boxes are now in position to have the weaving proceed to accomplish the closing-in operation.

The pins in the boxes are held from being pulled out by reason of the small keys 18 as already explained, and they are held from sliding out of the ends of the boxes while the sections are transposed from one position to the other by the gates 29.

The next result produced by the cam 100 is the moving of the gear 108 into engagement with the gear 109 thereby driving the gears 123, and 125 with which the cam shaft gears 126 are now in mesh.

The closing-in batten is active in this position of the boxes and is oscillated continuously when the shaft 110 is driven, by means of a crank arm 165 which is connected by a link 166 to an oscillating rod 167.

The closing-in batten structure is shown in Figs. 22-25 inclusive and will be hereinafter described in detail.

Finally, when the closing-in operation, as controlled by cams 100 and 100ᵃ is finished and the endless belt of fabric complete, the bevel gear 108 is disconnected from the gear 109, the mechanism stopped, and the completed product may be removed from the machine.

The reciprocatory movement of the batten carriage 6 has become more and more restricted and when the closing-in operation is complete the batten carriage has ceased to move although the crank 148 continues to drive the spring connected block 149. The device is thus rendered inactive without disconnecting the driving mechanism.

As indicated in Figs. 1 and 32, I provide clamping means designated 180 for holding the fabric while the boxes are swung from the straight-away braiding to the closing-in positions.

*Closing-in pin boxes.*

Each of the pin boxes 5 has upwardly extending projections 90 which terminate in hubs 91 and constitute suspenders, the hubs being pivotally mounted on shaft sections 92 of the pivoted arms 93 and 93ᵃ. The arms, as shown in Figs. 1 and 2, are inclined so that the pins in the pin boxes are substantially in alinement with the threads as they are stretched from the batten carriage 6 to the pin box during the straight-away braiding of the fabric. The arms 93 and 93ᵃ are adapted to be swung through an angle and their positions are determined by the shafts 94, 94ᵃ which turn concurrently as already pointed out.

The track rails 2 are evidently arranged to prevent the box sections from moving downwardly and consequently when the arms 93 and 93ᵃ swing downwardly the suspender projections 90 are put in compression and transmit forces to the box sections, which cause the coöperating sections to separate. The sections are assisted to separate by the action of the gate mechanism and move under these conditions from the position shown in Fig. 2, for example, to the position shown in Fig. 4, the arms moving from the position shown in Fig. 1 to the position shown in Fig. 3.

It is evident that the pins would slide out of the boxes unless they are held in place since the boxes are tipped up on end but this is taken care of by the gates 29 which are closed by springs 99 as shown as the box sections 5 begin to separate.

The arrangement of these gates is clearly shown in Figs. 10, 12 and 19 to which special attention is now directed. Extending downwardly from the bottom of each box near its open end is a bracket 152 on which rack bars 153 are slidably mounted in a plane substantially parallel with the bottom of the box. The gear wheel 154 is rotatively mounted on the bracket in mesh with the rack bar and a lever arm 155 is secured to the pivot shaft of the gear and is connected by a lost motion connection 156 to one of the gates 29. The outer surfaces of the boxes adjacent to their open ends are provided with slots or grooves 157 with which guide rollers 158 of the gates are adapted to coöperate.

The springs 99 are connected at one end to the brackets 152 near the boxes and at their opposite ends to the lever arm 155 so that they tend to push the gates out.

The grooves 157 are close together when the boxes are in juxtaposition as shown in Fig. 10 and assuming that the gates are open they cannot shut until the boxes are slightly separated. It is evident that they will shut as soon as the boxes begin to separate and this is the invention since they are arranged to prevent the pins from falling out of the box as the boxes are separated.

The rack bars 153 are for the purpose of opening the gates when the boxes are again brought together. The bars are in alinement and as the boxes come together they are pushed backwardly and turn the gears 154 so as to swing the arms 155 and open the gates.

The edge forming plate 30 during the straight-away braiding operation determines by its action the pin movements in such manner as to limit the width of the fabric and form the edge or selvage. However, at the beginning of the closing-in operation and during the formation of the V-shaped ends the edge forming plate action is modified so as to permit the spreading of the pins into both sections of the pin box, the essence of pin movements being clearly indicated by the diagrams of Figs. 55 et seq.

Closing-in battens.

Mounted on a curved guideway 170 is a carrier 171 to which a plurality of outwardly extending arms 172 are affixed. One of these arms is shown in detail in Fig. 25 and is provided with a slot 173 in which an annular finger 174 is slidably mounted. It is held in an intermediate position in the length of the arm 172 by means of a spring 175. The spring is relatively light so that the finger may slide outwardly away from the point of attachment between the arm and the carrier 171.

The arms 172 are arranged in two groups so that when the fingers 174 are in position they are arranged in two opposed groups and they are narrow and arranged close together to constitute combs or battens with yieldingly supported teeth.

This batten is intended to carry the intertwining of the braided strands close against the preceding row during the closing-in operation when it is necessary to work in a V-shaped notch or opening as shown in Figs. 7 and 36.

When the reciprocating rod 167 is actuated by the crank 166 as already explained, the carrier 171 to which the rod 167 is connected is oscillated on the curved guideway 170 and the fingers 174 come into operation alternately. The fingers of each set follow the weave as clearly shown in Fig. 23. At the same time the other set, by reason of the curved formation of the guideway 170, is below the plane of the fabric, permitting the new intertwining of the threads.

When the carrier is oscillated in the opposite direction the other set of fingers engage the threads and force the new weave into place. This action is continued until the threads are woven from the bottom of the V notches outwardly and complete the endless belt of fabric. When the belt is complete the ends of the threads extend laterally from the place where the closing-in weave was accomplished and it is now only necessary to cut off the ends of the thread to complete the product.

Method of braiding.

As shown in Fig. 11 the group of pin boxes on one side of the machine is provided with one hundred sixty-eight active pins, that is, one hundred sixty-eight threads or strands, either single or double are utilized in the particular case illustrated.

The active pins are given a succession of movements constituting a cycle of operation which depends upon a single revolution of the cams 42—43—50—51. In order that the cycle of operation may be made clear without any unnecessary complication I have included a series of diagrams in Figs. 39 to 53 inclusive in which there are twenty-eight active pins employed.

Fig. 39 shows a section of fabric with its strands spread to illustrate the braid and bearing sectional references to the following diagrams.

Referring first to Fig. 40 the active pins to which strands are connected are numbered 1 to 28. The first movement of the pins in the braiding cycle is the longitudinal shifting of the row numbered 3, 7, 11, etc., and the row numbered 4, 8, 12, etc., a distance of one pin to the left. The pins 1, 3, 2, 4, 5, 7, 6, 8, etc., are now in alinement transversely of the pin box as shown in Fig. 41. This movement of the pins is produced as shown in Fig. 11, by a movement of the actuators 36 in response to the action of the cam 43.

The actuators 37 now move the pins 1, 5, 9, etc., and 2, 6, 10, etc., to the right one space making the arrangement as shown in Fig. 42. From this position the pins 1, 2, 5, 6, 9, 10, etc., are moved laterally of the pin box a distance of one pin in an upward direction while the pins 3, 4, 7, 8, 11, 12, etc., are moved downwardly a distance of one pin. These movements are produced by the actuators 12 in response to the cam 51. The pins now occupy the positions shown in Fig. 42ᵃ.

The rows of pins 3, 7, 11, etc., 4, 8, 12, etc., are next moved longitudinally to the left the distance of one pin leaving the pins in the position of Fig. 43. The next lateral action moves pins 3, 4 at one edge and pins 25, 26 at the other edge a distance of two pins from one pair of rows to the other pair of rows. This motion of the end pins is accomplished for the purpose of making the selvage of the fabric and is brought about by proper movement of the plates 30 as controlled by the cams 50. The pins now occupy the positions shown in Fig. 43ᵃ.

The rows 3, 1, 5, 9, etc., and 4, 2, 6, 10, etc., are moved longitudinally of the pin box a distance of one pin, bringing the pins in the position shown in Fig. 44. The rows 3, 1, 5, 9, etc., 4, 2, 6, 10, etc., are next moved downwardly a distance of one pin while the other two rows are moved upwardly a distance of one pin, leaving the pins in a position of Fig. 44ᵃ which corresponds to that of Fig. 42.

They are next moved to the position of Fig. 45 corresponding to Fig. 41; then to the position of Fig. 46 corresponding to Fig. 42. The lateral actuators 12 next move the pins into a position of Fig. 46ᵃ which corresponds to Fig. 40.

Next the rows 7, 11, 15, 19, etc., and 8, 12, 16, 20, etc., are moved a distance of one pin longitudinally to the left leaving the pins in the arrangement of Fig. 47.

The pins 7, 8, 21 and 22 are now in position to be actuated by the plates 30 and they are now shifted to carry the threads from one face of the fabric to the other to form the selvage, the arrangement resulting being shown in Fig. 47ª.

The pins 7, 3, 1, 5, 9, etc., and 8, 4, 2, 6, 10, etc., are moved longitudinally to the right a distance of one pin leaving the pins in the arrangement of Fig. 48, which corresponds to that of Fig. 42. The next movement leaves the pin in the position of 48ª corresponding to 42ª.

The rows 11, 15, 19, 23, etc., and 12, 16, 20, 24, etc., are next moved to the left a distance of one pin leaving the arrangement as shown in Fig. 49. The pins 7, 3, 1, 5, etc., and 8, 4, 2, 6, etc., are next moved one pin to the right, producing the arrangement of Fig. 50. This corresponds to Fig. 44 and the next lateral movement produces the arrangement of Fig. 50ª corresponding to Fig. 44ª.

The rows 11, 15, 19, 23, etc., and 12, 16, 20, 24, etc., are moved a distance of one pin to the left producing the arrangement of Fig. 51. The end pins are next shifted in producing the selvage, in this case pins 11 and 12 and 17 and 18 being in the notches of the actuating plates 30. After they are shifted the pins occupy the positions of Fig. 51ª.

The pins 15, 19, 23, etc., and 16, 20, 24, etc., are moved longitudinally a distance of one pin to the left, producing the arrangement of Fig. 52 which corresponds to Fig. 42 and is the end of the first cycle, Figs. 40 to 52 inclusive constituting all the movements of one cycle. The weave as it progresses may be followed in Fig. 39 since the section lines are numbered to correspond to the diagrams.

Attention is directed to the fact that there are two strands or threads, one over the other, at each surface of the web in a plurality of positions. Attention is further directed to the fact that the fabric produced is multiply and nevertheless the strands have no sharp twists, the turns as shown in the plan views having the smallest angles.

The cycle of braiding will be repeated an indefinite number of times until the straight-away braiding has progressed sufficiently to bring the closing-in mechanism into operation. In the course of this work, the positive and negative pins at opposite sides of the machine do not interweave. Before the pin boxes are shifted from their straight-away braiding relation the plates 30 are disconnected from the cam 50 and these plates are operated in synchronism with the actuators 12, both sets of which are now moved in response to the cam 51. The pins are now spread and occupy successively the positions shown in Figs. 54 to 69, inclusive, the braiding being continued to produce the pointed ends illustrated in Fig. 35.

When this point is reached in the progress of the apparatus the pin boxes are shifted to their closing-in relation, the ends of the fabric being brought together in the position of Fig. 36, with the strands extending laterally outwardly as therein illustrated. The braiding operation is again commenced, the positive and the negative pins interweaving, the pins of one box being shifted and intermingled with the pins of a box which is now adjacent but which was formerly on the opposite side of the machine. The diagrams shown in Figs. 70 to 79 indicate the movement of the strands during the final closing-in operation.

The operation of the machine will be understood from the general description of the operation and the detailed description of the various sections of the machine particularly in view of the braiding diagrams which indicate the successive positions occupied by the pins.

Instead of securing a single or double strand to each pin it is of course possible to mount a spool on each pin but for the purpose of producing an endless belt I consider the strands of definite length preferable because when spools are employed the pins are necessarily larger and the machine more cumbersome. An arrangement of this kind is shown on a relatively large scale in Fig. 38.

When the ring or belt has been completed and removed from the machine the pin boxes are returned to their initial position and the battens are reset. This may be accomplished in any suitable manner either automatically or manually. In the arrangement illustrated I have provided for temporarily disconnecting the gears 67 from active engagement with the rack 68 by means of the clutch coupling illustrated in Fig. 27, to permit the ready resetting of the battens and depend upon the reversal of the driving connection to the shaft 94 to return the pin boxes to their initial positions.

Attention is particularly directed to the fact that the strands are periodically arranged in rows with spaces between them, as shown in Fig. 41 for example, and the movement of the reciprocating batten holder is timed so that the batten or comb engages the strands when they are arranged in this manner. By this means the action of the battens is positive and there is no danger of the strands becoming displaced by improper engagement of the batten.

Nevertheless, the arrangement of details will be largely governed by the product which is to be produced on the machine, and the size of the threads used in braiding; and it is evident that variations in pattern and the method of braiding as well as numerous modifications of the mechanism may be effected without departing from the spirit and scope of my invention, and I therefore intend only such limitations as are imposed by the appended claims.

What I claim is:

1. A braiding machine comprising in combination a strand support, a pin box having movable actuators, spaced strand carriers in the pin box and movable by the actuators in different directions and movable spacing means between said carriers and movable therewith to maintain the spaced relations of the carriers.

2. A braiding machine comprising a strand support, a pair of coöperating actuators having a plurality of interleaved members, notches therein, strand carriers mounted in the notches, and means for shifting the actuators to adjust the carriers and braid the strands.

3. A braiding machine comprising a strand support, a pair of coöperating actuators having a plurality of interleaved members, notches therein, strand carriers mounted in the notches, means for moving the actuators to bring the notches into register in different relations, and means for moving the strand carriers forth and back in the notches.

4. A braiding machine comprising a strand support, a pair of coöperating actuators having a plurality of interleaved members, notches therein, strand carriers mounted in the notches, means for moving the actuators to bring the notches into register in different relations, and means for moving the strand carriers forth and back in the notches, and means for adjusting the actuators to move the pins into different relations.

5. A braiding machine comprising interleaved actuators having alining notches adapted to register in a plurality of relations, strand carriers in said notches, and means for alternately adjusting the actuators and moving the carriers in the registering notches transversely of the actuators.

6. A braiding machine comprising actuators each having a plurality of spaced plates interleaved in pairs, and provided with notches adapted to register in a plurality of positions to produce transverse channels, a plurality of pins mounted in said channels, means for attaching strands to certain of said pins, means for moving the actuators to shift the pins with the actuator plates from one channel to another, and means for adjusting the pins longitudinally of the channels.

7. A strand carrier for braiding machines comprising a pin, means adapted to be attached to a strand, and a straight line yielding connection between the attaching means and the pin.

8. A braiding machine comprising a hollow pin, a strand attachment member at one end, and a yielding connection between the pin and the attachment member.

9. A braiding machine comprising a hollow pin, a strand attachment member at one end, and a resilient means within the pin for connecting the attachment member to the pin.

10. A strand carrier comprising a hollow pin, a spring within the pin attached thereto at one end, a strand attachment hook at the opposite end of the pin, and yielding means for connecting the hook to the spring.

11. A braiding machine comprising a pair of coöperating actuators arranged to provide a plurality of channels, pins mounted in the channels adapted to be shifted in groups therein, movable means spacing the pins in prearranged groups and having means for attachment to the strands to be braided.

12. A braiding machine comprising a pair of coöperating actuators arranged to provide a plurality of channels, pins mounted in the channels and having means for attachment to the strands to be braided, movable spacing means between the pins and shiftable therewith, and means for adjusting the actuators to vary the relative positions of the pins in groups.

13. A braiding machine comprising a pair of coöperating actuators arranged to provide a plurality of channels with keyways in each channel, a plurality of pins having transverse keys extending into the keyways and movably mounted in the channels, said actuators being adjustable in straight lines to transfer the pins relative to each other.

14. A braiding machine comprising interleaved actuators having alining notches adapted to register in a plurality of relations to provide channels, said channels having longitudinal keyways, pins mounted in the channels and having keys engaging the keyways therein, and means for moving the actuators to move the pins into different relations without removing them from the actuators.

15. A braiding machine comprising actuators, each having a plurality of spaced plates interleaved in pairs and provided with notches adapted to register in a plurality of positions to produce channels having longitudinal keyways, a plurality of pins mounted in said channels and having keys coöperating with the keyways therein, and means for adjusting the actuators, said pins corresponding in thickness to the thickness of the actuator plates whereby they are shifted from one channel to another as the actuators are moved in different relations.

16. A braiding machine comprising a pin box having bearing brackets mounted on the bottom of the pin box, rotary cams supported by said bearing brackets, actuators mounted to slide in straight lines in said boxes, and an operative connection between the actuators and the cams.

17. A braiding machine comprising a pin box having bearing brackets mounted on the bottom of the pin box, rotary cams supported by said bearing brackets, actuators mounted to slide in straight lines in said boxes, and an operative connection between the actuators and the cams, and strand carriers supported, and adapted to be moved into varying relations, by the actuators.

18. A braiding machine comprising in combination with a movable pin box and means for shifting the same, a plurality of actuators to move at right angles in the pin box, cams for governing the movement of the actuators and strand carriers mounted in the actuators.

19. A braiding machine comprising movable pin boxes, pins adapted to be connected to the strands to be braided, a pair of actuators movable in one direction in the pin box, arranged to constitute supports for the strand carriers, and other actuators movable in straight lines at an angle to the movement of the first actuators.

20. A braiding machine comprising movable pin boxes, pins adapted to be connected to the strands to be braided, a pair of actuators movable in one direction in the pin box, arranged to constitute supports for the strand carriers, and other actuators movable in straight lines at an angle to the movement of the first actuators and cams for governing the movement of the actuators.

21. A braiding machine comprising movable pin boxes, pins adapted to be connected to the strands to be braided, a pair of actuators movable in one direction in the pin box, arranged to constitute supports for the strand carriers, and other actuators movable in straight lines at an angle to the movement of the first actuators and means for producing alternate movements of the respective actuators.

22. A braiding machine comprising movable pin boxes, pins adapted to be connected to the strands to be braided, a pair of actuators movable in one direction in the pin box, arranged to constitute supports for the strand carriers, and other actuators movable in straight lines at an angle to the movement of the first actuators, a shaft rotatively mounted on the bottom of the box and cams on said shaft for governing the movements of the actuators.

23. A braiding machine comprising means for supporting the strands to be braided, a guide substantially parallel to the strands, a batten carriage mounted to reciprocate on the guide and a batten arranged to occupy an active position on the carriage in one direction of carriage movement.

24. A braiding machine comprising means for supporting the strands to be braided, a guide substantially parallel to the strands, a batten carriage mounted on the guide, means for producing a reciprocatory movement thereof and a batten arranged to occupy an active position on the carriage in one direction of carriage movement.

25. A braiding machine comprising means for supporting the strands to be braided, a guide substantially parallel to the strands, a batten carriage mounted on the guide, means for producing a reciprocatory movement thereof, means for limiting said reciprocatory movement and a batten arranged to occupy an active position on the carriage in one direction of carriage movement.

26. A braiding machine comprising means for supporting the strands to be braided, a guide substantially parallel to the strands, a batten carriage mounted on the guide, means for producing a reciprocatory movement thereof, adjustable means for limiting the reciprocatory movement of the batten carriage and a batten arranged to occupy an active position on the carriage in one direction of carriage movement.

27. A braiding machine comprising means for supporting the strands to be braided, a guide substantially parallel to the strands, a batten carriage mounted on the guide, means for producing a reciprocatory movement thereof, and adjustable means adapted to be advanced step by step as the braiding process progresses, for limiting the reciprocatory movement of the batten carriage.

28. A braiding machine comprising means for supporting the strands to be braided, a guide substantially parallel to the strands, a batten carriage mounted to reciprocate on the guide, and a batten slidably mounted on the carriage arranged in a retracted position when the carriage moves in one direction.

29. A braiding machine comprising means for supporting the strands to be braided, a guide substantially parallel to the strands, a batten carriage mounted on the guide, means for producing a reciprocatory movement thereof, and a batten slidably mounted on the carriage arranged in a retracted position when the carriage moves in one direction.

30. A braiding machine comprising means for supporting the strands to be braided, a guide substantially parallel to the strands, a batten carriage mounted on the guide, means for producing a reciprocatory movement thereof, means for limiting said reciprocatory movement, and a batten slidably mounted on the carriage arranged in a retracted position when the carriage moves in one direction.

31. A braiding machine comprising means for supporting the strands to be braided, a guide substantially parallel to the strands, a batten carriage mounted on the guide, means for producing a reciprocatory movement thereof, adjustable means for limiting the reciprocatory movement of the batten carriage, and a batten slidably mounted on the carriage arranged in a retracted position when the carriage moves in one direction.

32. A braiding machine comprising means for supporting the strands to be braided, a guide substantially parallel to the strands, a batten carriage mounted on the guide, means for producing a reciprocatory movement thereof, adjustable means adapted to be advanced step by step as the braiding process progresses, for limiting the reciprocatory movement of the batten carriage, and a batten slidably mounted on the carriage arranged in a retracted position when the carriage moves in one direction.

33. A braiding machine comprising means for supporting the strands to be braided, a guide substantially parallel to the strands, a batten carriage mounted on the guide, means for producing a reciprocatory movement thereof, and adjustable means actuated by the batten carriage and adapted to limit the extent of the reciprocatory movement of the carriage.

34. A braiding machine comprising guideways, strand supports adjustably mounted thereon, strands having their intermediate portions extending over and supported by said strand supports, braiding carriers connected with the opposite ends of said strands and batten carriages reciprocating on the guide-ways aforesaid.

35. A braiding machine comprising a guideway, a strand support adjustably mounted thereon, and a batten carriage adapted to reciprocate on the same guideway, the strand support being advanced in response to each reciprocation of the batten carriage.

36. A braiding machine comprising a guideway, a strand support adjustably mounted thereon, a batten carriage adapted to reciprocate on the same guideway, and means mounted on the batten carriage for actuating the strand support.

37. A braiding machine comprising a guideway, a strand support adjustably mounted thereon, a batten carriage adapted to reciprocate on the same guideway, and a rack bar mounted on the batten carriage adapted to actuate the strand support and to advance the same at each upward movement of the batten carriage.

38. A braiding machine comprising a guideway having a rack associated therewith, a strand support mounted on the guideway, a gear rotatively mounted on a support and meshing with a rack of the guideway, a pawl operatively connected to the gear on the strand support, a batten carriage adapted to reciprocate on the same guideway, and an actuator thereon adapted to engage the pawl on the strand support.

39. A braiding machine comprising means for stretching the strands to be braided, a guideway substantially parallel to the strands, a batten carriage mounted to reciprocate on the guideway, a toothed batten mounted on the carriage and engaging with a longitudinal movement, the strands parallel to the travel of the carriage, and means for actuating the batten.

40. A braiding machine comprising means for stretching the strands to be braided, a guideway substantially parallel to the strands, a carriage mounted on the guideway, a batten on said carriage, gears for advancing and retracting the batten on the carriage and a stationary actuator adapted to coöperate with the gearing to operate with the batten.

41. A braiding machine comprising means for stretching the strands to be braided, a guideway substantially parallel to the strands, a carriage mounted on the guideway, a batten on said carriage, latches for holding the batten on the carriage, means for advancing and retracting the batten on the carriage comprising gears adapted to coöperate with the batten and a ratchet operatively connected to the gears, and a stationary rack adapted to engage the pawl when the carriage approached one end of its travel on the guideways.

42. A braiding machine comprising means for stretching the strands to be braided, a guideway substantially parallel to the strands, a strand support mounted on the guideway, and a batten carriage mounted to reciprocate on the guideway from and toward the strand support, a batten strip mounted on the strand support, a second batten strip mounted on the carriage, means for retracting the batten strip on the support as the carriage approaches, and means for transferring the batten strip from the carriage to the support.

43. A batten structure for braiding machines comprising a strand support, a batten having rack teeth near its respective edges, actuating gears mounted on the support, and releasable catches for holding the batten in position to slide on the support in response to the turning of the gears, a batten carriage adapted to reciprocate from and toward the support, and means thereon for actuating the gears to retract the batten on the support.

44. A batten structure for braiding machines comprising a strand support, a batten having rack teeth near its respective edges, actuating gears mounted on the support, and releasable catches for holding the batten in position to slide on the support in response to the turning of the gears, a batten carriage adapted to reciprocate from and toward the support, and an actuating rack thereon adapted to actuate the gears to retract the batten on the support.

45. A batten structure for braiding machines comprising a strand support, a batten having rack teeth near its respective edges, actuating gears mounted on the support, and releasable catches for holding the batten in position to slide on the support in response to the turning of the gears, a batten carriage adapted to reciprocate from and toward the support, a batten on the carriage having rack teeth corresponding to the batten on the support, and means on the carriage for retracting the batten on the support as the carriage approaches.

46. A batten structure for braiding machines comprising a strand support, a batten having rack teeth near its respective edges, actuating gears mounted on the support, and releasable catches for holding the batten in position to slide on the support in response to the turning of the gears, a batten carriage adapted to reciprocate from and toward the support, a batten on the carriage having rack teeth corresponding to the batten on the support, latches for holding the batten on the carriage, means for retracting the batten on the support as the carriage approaches, said latches on the support and on the carriage being adapted to be released to transfer the batten from the carriage to the support.

47. A batten structure for braiding machines comprising a strand support, a batten having rack teeth near its respective edges, actuating gears mounted on the support, and releasable catches for holding the batten in position to slide on the support in response to the turning of the gears, a batten carriage adapted to reciprocate from and toward the support, a batten on the carriage having rack teeth corresponding to the batten on the support, latches for holding the batten on the carriage, means for retracting the batten on the support as the carriage approaches, said latches being arranged to transfer the retracted batten from the support to the carriage and to transfer the active batten from the carriage to the support.

48. A batten structure for braiding machines comprising a strand support, a batten having rack teeth near its respective edges, actuating gears mounted on the support, and releasable catches for holding the batten in position to slide on the support in response to the turning of the gears, a guideway on which the support is mounted, rack teeth on the guideway, a gear mounted on the support meshing with the rack teeth and operatively connected to the batten gears, and means for actuating the gearing to retract the batten and advance the support on the guideway.

49. A braiding machine comprising a pair of strand supports, a plurality of strand carriers arranged in groups, means for shifting the positions of the groups of carriers to braid the strands into a fabric, and means for adjusting the groups to interconnect the strands to join the ends of the fabric.

50. A braiding machine comprising a pair of strand supports and two groups of strand carriers adapted to have a plurality of strands connected to the carriers at their respective ends and held intermediate their ends by their supports, means for shifting the strand carriers to braid the strands at each end, and means for shifting the groups to interconnect the strands for closing in the ends of the braided fabric.

51. A braiding machine comprising two groups of strand carriers each composed of two sub-groups, means for shifting the carriers of the respective groups to braid the strands of the fabric, and means for adjusting the positions of the sub-groups to unite the sub-group of one principal group with the sub-group of the other, and means for shifting the carriers to interconnect the strands and close the ends of the fabric.

52. A braiding machine comprising a pair of spaced brackets, a substantially horizontal frame providing track rails, a pair of pin box cradles mounted on the track rails, pivotally suspended pin boxes mounted in the cradles, a plurality of strand carriers in each pin box, means for shifting the carriers in the boxes to braid the strands attached thereto, and means for swinging the pin boxes on their pivots into a different relation to interconnect the strands of the different boxes.

53. A braiding machine comprising spaced supports with substantially horizontal track rails, a pair of pin box cradles mounted on the track rails at the respective sides of the machine, a superstructure composed of a pair of inclined guideways converging upwardly, a pair of strand supports mounted on the inclined guideways, a pair of pin boxes mounted in each cradle and a plurality of strand carriers in each pin box, a plurality of strands being mounted on the supports with their ends connected to the carriers of the respective cradles, means for shifting the carrier of each pair of boxes to braid the strands, and means for swinging the boxes to bring the carriers of two previously separated pin boxes together.

54. A pin box structure comprising a pair of boxes mounted end to end and having their adjacent ends open, means in each box arranged to provide a plurality of channels, a plurality of strand carriers mounted in the channels, and means for adjusting the carriers in the boxes to braid the strands.

55. A pin box structure comprising a pair of boxes mounted end to end and having their adjacent ends open, means in each box arranged to provide a plurality of channels, a plurality of strand carriers mounted in the channels, means for adjusting the carriers in the boxes to braid the strands, and means for separating the boxes under predetermined conditions.

56. A pin box structure comprising a pair of boxes mounted end to end and having their adjacent ends open, means in each box arranged to provide a plurality of channels, a plurality of strand carriers mounted in the channels, means for adjusting the carriers in the boxes to braid the strands, means for separating the boxes under predetermined conditions, and gates for closing the boxes as they separate to hold the strand carriers in position.

57. A pin box structure comprising a pair of boxes mounted end to end and having their adjacent ends open, actuators in each box adapted to coöperate with each other and with the actuators of the other box to provide continuous slots or grooves, a plurality of strand carriers mounted in the slots, and means for adjusting the positions of the actuators to shift the carriers and braid the strands.

58. A pin box structure comprising a pair of boxes mounted end to end and having their adjacent ends open, actuators in each box adapted to coöperate with each other and with the actuators of the other box to provide continuous slots or grooves, a plurality of strand carriers mounted in the slots, means for adjusting the positions of the actuators to shift the carriers and braid the strands, and means for separating the boxes under predetermined conditions.

59. A pin box structure comprising a pair of boxes mounted end to end and having their adjacent ends open, actuators in each box adapted to coöperate with each other and with the actuators of the other box to provide continuous slots or grooves, a plurality of strand carriers mounted in the slots, means for adjusting the positions of the actuators to shift the carriers and braid the strands, means for separating the boxes under predetermined conditions, and gates for closing the boxes as they separate to hold the strand carriers in position.

60. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands.

61. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, said interleaved actuators being adapted to shift the carriers laterally in the boxes.

62. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, said interleaved actuators being adapted to shift the carriers laterally in the boxes in alternation with the longitudinal actuators.

63. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, said interleaved actuators being adapted to shift the carriers laterally in the boxes in alternation with the longitudinal actuators, and means for separating the boxes under predetermined conditions.

64. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, said interleaved actuators being adapted to shift the carriers laterally in the boxes in alternation with the longitudinal actuators, means for separating the boxes under predetermined conditions, and gates for closing the boxes as they separate to hold the strand carriers in position.

65. A braiding machine comprising a pair of pin boxes on each side, each of said pairs comprising two boxes with open ends arranged end to end, a plurality of strand carriers in each box, and means for shifting the pins within the pair of boxes to braid the strands, means for separating the boxes of each pair and uniting the boxes in a different relation with the box of one pair adjacent to the box of another pair.

66. A braiding machine comprising a pair of pin boxes on each side, each of said pairs comprising two boxes with open ends arranged end to end, a plurality of strand carriers in each box, means for shifting the pins within the pair of boxes to braid the strands, means for separating the boxes of each pair and uniting the boxes in a different relation with the box of one pair adjacent to the box of another pair, and gates for closing the open ends of the boxes as they separate to hold the carriers in position.

67. A braiding machine comprising two pairs of pin boxes, the boxes of each pair being arranged end to end with their adjacent ends open, interleaved actuators adapted to move transversely in each box and notched to provide longitudinal channels, a plurality of pins mounted in the channels, longitudinal actuators for shifting the pins between the boxes of each pair for braiding the strands, and means for separating the boxes and uniting the box of one pair with the box of another pair, and means for shifting the pins to braid the strands.

68. A braiding machine comprising four pin boxes arranged in pairs, each pin box comprising transverse actuators, longitudinal actuators, cams for producing movements thereof, and strand carriers mounted in the actuators and adapted to be shifted thereby in the boxes, means for operating the cams to shift the pins between the boxes of each pair during straight-away braiding, and means for separating the boxes and uniting them in different relations, and producing further operation of the cams to shift the pins for closing-in.

69. A braiding machine comprising two sides, means for supporting a plurality of strands intermediate their ends, strand carriers to which the respective ends of the strands are connected, boxes for holding the strand carriers on opposite sides of the machine, and means for shifting the strands to braid from the center toward the ends.

70. A braiding machine comprising two sides, means for supporting a plurality of strands intermediate their ends, strand carriers to which the respective ends of the strands are connected, boxes for holding the strand carriers on opposite sides of the machine, means for shifting the strands to braid from the center toward the ends, and means for uniting the carriers in groups to close the ends of the fabric when the braiding has progressed to a predetermined extent.

71. A braiding machine comprising two sides, means for supporting a plurality of strands intermediate their ends, strand carriers to which the respective ends of the strands are connected, a pair of boxes on each side of the machine in which the carriers are disposed, means for shifting the pins in the boxes of each pair to braid the fabric from the center toward the ends of the strands, and means for separating the boxes and uniting a box of one side with a box of the other side of the machine, and means for shifting the carriers between the boxes in their last-named relation to braid the strands of the two halves and close the fabric.

72. A braiding machine comprising a pair of inclined guideways, a strand support on each guideway, a pair of boxes near the lower end of each guideway, strand carriers mounted in the boxes, the strands to be braided being carried intermediate their ends on supports, and connected at their ends to the strand carriers in the boxes, means for shifting the carriers in the boxes to braid the strands and battens mounted to reciprocate on the guideways.

73. A braiding machine comprising a pair of inclined guideways, a strand support on each guideway, a pair of boxes near the lower end of each guideway, strand carriers mounted in the boxes, the strands to be braided being carried intermediate their ends on supports, and connected at their ends to the strand carriers in the boxes, means for shifting the carriers in the boxes to braid the strands, battens mounted to reciprocate on the guideways, and means dependent on the movement of the battens for advancing the supports step by step as the braiding progresses.

74. A braiding machine comprising a pair of inclined guideways, a strand support on each guideway, a pair of boxes near the lower end of each guideway, strand carriers mounted in the boxes, the strands to be braided being carried intermediate their ends on the strand supports, and connected at their ends to the strand carriers in the boxes, means for shifting the carriers in the boxes to braid the strands, battens mounted to reciprocate on the guideways, means dependent on the movement of the battens for advancing the supports step by step as the braiding progresses, and means for initiating the shifting of the boxes to unite the carriers in a new relation when the braiding has progressed to a predetermined extent.

75. A braiding machine comprising a pair of inclined guideways, a strand support on each guideway, a pair of boxes near the lower end of each guideway, strand carriers mounted in the boxes, the strands to be braided being carried intermediate their ends on supports, and connected at their ends to the strand carriers in the boxes, means for shifting the carriers in the boxes to braid the strands and battens mounted to reciprocate on the guideways, a pivoted cradle for each box, and means for swinging the cradle to bring the box into a new relation when the braiding has advanced to a predetermined extent.

76. A braiding machine comprising a pair of inclined guideways, a strand support on each guideway, a pair of boxes near the lower end of each guideway, strand carriers mounted in the boxes, the strands to be braided being carried intermediate their ends on supports, and connected at their ends to the strand carriers in the boxes, means for shifting the carriers in the boxes to braid the strands and battens mounted to reciprocate on the guideways, a pivoted cradle for each box, and means dependent upon the advancement of the support for swinging the cradle to bring the box into a new relation when the braiding has advanced to a predetermined extent.

77. A braiding machine comprising means for supporting the strands to be braided intermediate their ends, a pair of inclined guides substantially parallel to the end portions of the strands, a pair of pin boxes near the foot of each guideway, pins mounted in each box connected to the ends of the strands, battens mounted to reciprocate on the guideways, and means on the battens for advancing the strand supports step by step.

78. A braiding machine comprising means for supporting the strands to be braided intermediate their ends, a pair of inclined guides substantially parallel to the end portions of the strands, a pair of pin boxes near the foot of each guideway, pins mounted in each box connected to the ends of the strands, battens mounted to reciprocate on the guideways, means on the battens for advancing the strand supports step by step, a cradle for each box, and means dependent upon the advance of the strand support for swinging the cradle to carry the boxes into new relation.

79. A braiding machine comprising a pair of inclined guideways, a strand support mounted on each guideway, a batten carriage mounted to reciprocate on the guideways, means on the batten carriages for actuating the supports to advance them on the guideway step by step, cradles pivotally mounted near the foot of the inclined guideways, pin boxes mounted in the cradles, strand carriers mounted in the boxes, and connected to the ends of the strands which are attached intermediate their ends on the supports, cams on the supports, and means dependent on the cams for swinging the cradles with their boxes to unite the boxes in a new relation when the braiding operation has advanced to a predetermined extent.

80. A batten structure comprising a curved guideway, a carriage mounted on the guideway, means for reciprocating the carriage, and oppositely acting sets of yielding batten fingers mounted on the carriage.

81. A batten structure comprising a curved guideway, a carriage mounted on the guideway, means for reciprocating the carriage, battens mounted on the carriage comprising guide bars, batten fingers mounted to slide on the guide bars, and means for retracting the fingers.

82. A batten structure comprising a curved guideway, a carriage mounted on the guideway, means for reciprocating the carriage, battens mounted on the carriage comprising guide bars, batten fingers mounted to slide on the guide bars, and springs for retracting the fingers.

83. A batten structure comprising a curved guideway, a carriage mounted thereon, a reciprocatory actuator for causing the carriage to oscillate on the guideway, and battens secured to the carriage and composed of outwardly extending rods slotted to constitute parallel guides, and batten fingers mounted to slide in the guides.

84. A batten structure comprising a curved guideway, a carriage mounted thereon, a reciprocatory actuator for causing the carriage to oscillate on the guideway, battens secured to the carriage and composed of outwardly extending rods slotted to constitute parallel guides, batten fingers mounted to slide in the guides, and springs for retracting the fingers.

85. A braiding machine comprising a pair of reciprocating battens for straight-away braiding, and an oscillating batten structure for closing-in; and means for successively actuating the batten structures.

86. A braiding machine comprising a pair of inclined guideways, reciprocating battens thereon, an oscillating batten structure, means for driving the reciprocating battens, means for stopping the operation of the reciprocating battens and for starting the oscillating batten when the braiding has advanced to a predetermined extent.

87. A braiding machine comprising a pair of inclined guideways, pin boxes supported near the foot of the guideways, battens arranged to reciprocate on the guideways, means for swinging the pin boxes into a new relation for closing-in, and an oscillating batten adapted to operate after the boxes are swung to their closing-in position.

88. A braiding machine comprising a pair of inclined guideways, a strand support on each guideway, a pair of boxes near the lower end of each guideway, strand carriers mounted in the boxes, the strands to be braided being carried intermediate their ends on supports and connected at their ends to the strand carriers in the boxes, means for shifting the carriers in the boxes to braid the strands, battens mounted to reciprocate on the guideways, means dependent on the movement of the battens for advancing the supports step by step as the braiding progresses, means carried by the supports for shifting the positions of the boxes to unite the carriers in a new relation when the braiding has progressed to a predetermined extent, and an oscillating batten structure adapted to engage the strands when the boxes are in their closing-in positions.

89. A braiding machine comprising a pair of coöperating actuators arranged to provide a plurality of channels, pins mounted in the channels and having means for attachment to the strands to be braided, means for adjusting the actuators to vary the relative positions of the pins, and a selvage forming member adjacent to the actuators.

90. A braiding machine comprising interleaved actuators having alining notches adapted to register in a plurality of relations, strand carriers in said notches, means for alternately adjusting the actuators and moving the carriers in the registering notches transversely of the actuator segments, and a selvage forming plate adjacent to the actuators.

91. A braiding machine comprising actuators each having a plurality of spaced plates, said actuators interleaved in pairs, and provided with notches adapted to register in a plurality of positions to produce transverse channels, a plurality of pins mounted in said channels, means for attaching strands to certain of said pins, means for moving the actuators to shift the pins with the actuator plates from one channel to another, means for adjusting the pins longitudinally of the channels, and a selvage forming plate adjacent to the actuators.

92. A braiding machine comprising a pin box having bearing brackets mounted on the bottom of the pin box, rotary cams supported by said bearing brackets, actuators slidably mounted in said box, an operative connection between the actuators and the cams, a selvage forming plate adjacent to the actuators, and an independent cam for actuating the selvage forming plate.

93. A braiding machine comprising pin boxes, pins adapted to be connected to the strands to be braided, a pair of coöperating actuators movable in one direction in the pin box, arranged to constitute supports for the strand carriers, other actuators movable at an angle to the movement of the first actuators, and a selvage forming plate adjacent to the pair of coöperating actuators and movable in the same direction.

94. A braiding machine comprising pin boxes, pins adapted to be connected to the strands to be braided, a pair of coöperating actuators movable in one direction in the pin box, arranged to constitute supports for the strand carriers, other actuators movable at an angle to the movement of the first actuators, a selvage forming plate adjacent to the pair of coöperating actuators and movable in the same direction, cams for governing the movement of the actuators and an independent cam for actuating the selvage forming plate.

95. A pin box structure comprising a pair of boxes mounted end to end and having their adjacent ends open, actuators in each box adapted to coöperate with each other and with the actuators of the other box to provide continuous slots or grooves, a plurality of strand carriers mounted in the slots, means for adjusting the positions of the actuators to shift the carriers and braid the strands, and means for forming the selvage.

96. A pin box structure comprising a pair of boxes mounted end to end and having their adjacent ends open, actuators in each box adapted to coöperate with each other and with the actuators of the other box to provide continuous slots or grooves, a plurality of strand carriers mounted in the slots, means for adjusting the positions of the actuators to shift the carriers and braid the strands, means in each box coöperating with the actuators to form the selvage.

97. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, and selvage forming plates adjacent to the interleaved actuators.

98. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, selvage forming plates adjacent to the interleaved actuators, and means for connecting the selvage plates to operate with the actuators during predetermined conditions.

99. A pin box structure comprising a pair of boxes mounted end to end and having their adjacent ends open, interleaved actuators arranged in pairs in the respective boxes and having notches adapted to register to provide longitudinal channels, strand carriers mounted in the channels and longitudinal actuators for shifting the carriers in the channels to braid the strands, said interleaved actuators being adapted to shift the carriers laterally in the boxes in alternation with the longitudinal actuators, means for separating the boxes under predetermined conditions, and a selvage forming plate in each box adjacent to the interleaved actuators, and means for actuating the selvage plates with the interleaved actuators when the boxes are separated.

100. A braiding machine comprising a pin box having two pairs of interleaved actuators, and an interposed selvage plate all operating transversely of the box and independent cams for one pair of actuators and the selvage plate.

101. A braiding machine comprising a pin box having two pairs of interleaved actuators, and an interposed selvage plate all operating transversely of the box, independent cams for one pair of actuators and the selvage plate, and means for disconnecting the selvage plate from its cam and connecting all of the members to the actuator cam.

102. A braiding machine comprising a pin box having two pairs of interleaved actuators, and an interposed selvage plate all operating transversely of the box, independent cams for one pair of actuators and the selvage plate, and a link for disconnecting the selvage plate from its cam and connecting said plate to operate with the actuators.

103. A braiding machine comprising a pin box having two pairs of interleaved actuators and an interposed selvage plate all operating transversely of the box, independent cams for one pair of actuators and for the selvage plate, bell crank levers connected to the actuators and to the selvage plate, and a link adapted to interconnect the bell crank lever to cause the actuators and the selvage plate to be governed by a single cam.

104. A braiding machine comprising a plurality of pin boxes, each having two pairs of interleaved actuators having notches to provide slots, pins disposed in the slots and adapted to have strands connected to predetermined pins in one of the pairs of actuators, and means for moving the actuators to shift the pins within said one pair of actuators for straight-away braiding and among the two pairs for closing in.

105. A braiding machine comprising a plurality of pin boxes, each having two pairs of interleaved actuators having notches to provide slots, pins disposed in the slots and adapted to have strands connected to predetermined pins in one of the pairs of actuators, a selvage plate between the two pairs of actuators and means for first moving the one pair of actuators and the selvage plate for straight-away braiding and then moving both pairs of actuators and the selvage plate for closing in.

106. A braiding machine comprising a plurality of pin boxes, each having two pairs of interleaved actuators having notches to provide slots, pins disposed in the slots, strands connected to predetermined pins in one of the pairs of actuators, a selvage plate between the two pairs of actuators and means for first moving the one pair of actuators and the selvage plate for straight-away braiding and then concurrently moving both pairs of actuators and the selvage plate for closing in.

107. A braiding machine comprising a strand support, a pin box comprising movable actuators and strand carriers adapted to be shifted in groups longitudinally and transversely of the box by the actuators to braid the strands.

108. A braiding machine comprising a strand support, a pin box comprising movable actuators and strand carriers adapted to be shifted in rows in either direction by the actuators to braid the strands.

109. A strand carrier for braiding machines comprising a pin, attaching means adapted to be connected to a strand, and a longitudinal straight line yielding connection between the attaching means and the pin.

110. A braiding machine comprising a pair of coöperating actuators arranged to provide a plurality of channels with guideways in each channel, a plurality of strand carriers having transverse keys extending into the keyways and movably mounted in the channels, said actuators being adjustable in straight lines at right angles to each other to transfer the carriers in such manner as to braid the strands which are adapted to be attached to the carriers.

111. A braiding machine comprising interleaved actuators having alining openings adapted to register in a plurality of relations, strand carriers in said openings and means for adjusting the actuators to register different sets of openings therein and for shifting the strand carriers through the openings thus registered.

112. A braiding machine comprising interleaved actuators having alining openings adapted to register in a plurality of relations, strand carriers in certain of said openings and movable spacers in other openings and movable with the strand carriers through the openings for maintaining said carriers in spaced relation and means for adjusting the actuators to bring different sets of openings into register and for shifting the carriers and spacers through the registered openings.

113. A braiding machine comprising two groups of strand carriers each composed of two sub-groups, means for shifting the carriers of the respective groups to braid the strands of the fabric, means for adjusting the positions of the sub-groups to unite the sub-group of one principal group with the sub-group of the other and means for then relatively shifting the carriers in the thus united sub-groups.

114. A braiding machine comprising means for supporting a plurality of strands intermediate their ends, strand carriers to which the respective ends of the strands are connected, boxes for holding the strand carriers and means for shifting the strand carriers in said boxes to braid a fabric from the supported intermediate portion of the strands toward the ends thereof.

115. A braiding machine comprising in combination batten mechanism for straight-away braiding, batten structure for closing-in and means for successively actuating the straight-away braiding batten mechanism and the closing-in batten structure.

116. A braiding machine comprising strand carriers, means for shifting said carriers in different angularly related directions and movable spacing means separate from the carriers loosely fitting between the carriers and traveling therewith to maintain the carriers in predetermined spaced relations.

117. A braiding machine comprising in combination with a strand support, strand carriers, means for shifting said strand carriers in different angularly related directions to produce an interweaving movement thereof and movable spacing means independent of the carriers but loosely interposed between the carriers and traveling therewith.

118. A braiding machine comprising relatively movable interleaved actuators having alining openings registering in a plurality of positions of the actuators, strand carriers and movable spacers seated in said openings, means for relatively shifting the actuators to register different sets of openings and pushers for shifting the strand carriers and spacers through the registered openings.

In witness whereof, I have hereunto set may hand this 11th day of June, 1917.

ROBERT W. BROWN.